(12) United States Patent
Lee et al.

(10) Patent No.: US 12,223,421 B2
(45) Date of Patent: Feb. 11, 2025

(54) METHOD AND APPARATUS FOR TRANSCEIVING SIGNAL USING ARTIFICIAL INTELLIGENCE IN WIRELESS COMMUNICATION SYSTEM

(71) Applicant: Samsung Electronics Co., Ltd., Suwon-si (KR)

(72) Inventors: Seunghyun Lee, Suwon-si (KR); Hyojin Lee, Suwon-si (KR); Hanjin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 716 days.

(21) Appl. No.: 17/061,439

(22) Filed: Oct. 1, 2020

(65) Prior Publication Data

US 2021/0110261 A1    Apr. 15, 2021

(30) Foreign Application Priority Data

Oct. 10, 2019  (KR) .................. 10-2019-0125623

(51) Int. Cl.
*G06N 3/08* (2023.01)
*G06N 3/045* (2023.01)
(Continued)

(52) U.S. Cl.
CPC .............. *G06N 3/08* (2013.01); *G06N 3/045* (2023.01); *H04L 5/0055* (2013.01); *H04L 25/0204* (2013.01)

(58) Field of Classification Search
USPC .......................................................... 706/25
See application file for complete search history.

(56) References Cited

U.S. PATENT DOCUMENTS 6,078,513 A * 6/2000 Ong ...................... G11C 15/04
                                                         365/49.17
8,315,346 B2   11/2012 Kim et al.
(Continued)

FOREIGN PATENT DOCUMENTS

| CN | 109565338 A | 4/2019 |
| CN | 109756432 A | 5/2019 |

(Continued)

OTHER PUBLICATIONS

Zhu, Aug. 2019, "Autoencoder-Based Transceiver Design for OWC Systems in Log-Normal Fading Channel" (Year: 2019).*
(Continued)

*Primary Examiner* — Jeremy L Stanley
*Assistant Examiner* — Jun Kwon

(57) ABSTRACT

The present disclosure relates to a 5G communication system or a 6G communication system for supporting higher data rates beyond a 4G communication system such as long term evolution (LTE). A method of transmitting or receiving a signal by a user equipment (UE) in a mobile communication system is provided. The method may include: identifying a neural network model for transmitting first information to a base station (BS); learning a connection weight of the neural network model using the first information; transmitting, to the base station, second information for updating a weight of a second partial neural network corresponding to the base station based on a result of the learning; and updating a weight of a first partial neural network corresponding to the UE based on the result of the learning.

13 Claims, 19 Drawing Sheets

(51) Int. Cl.
  *H04L 5/00*   (2006.01)
  *H04L 25/02*  (2006.01)

(56) References Cited

U.S. PATENT DOCUMENTS

| | | | |
|---|---|---|---|
| 9,184,870 | B2 | 11/2015 | Sampath et al. |
| 10,326,510 | B2 | 6/2019 | Ko et al. |
| 10,432,272 | B1* | 10/2019 | Black .................. H04B 7/0486 |
| 10,482,174 | B1* | 11/2019 | Goodsitt ............... G06V 10/82 |
| 2002/0156754 | A1* | 10/2002 | Swimm .................. B41J 11/009 706/20 |
| 2010/0082126 | A1* | 4/2010 | Matsushita .......... G05B 13/027 706/15 |
| 2017/0293736 | A1* | 10/2017 | Kramer .................. G16H 10/60 |
| 2017/0330071 | A1* | 11/2017 | Roblek ...................... G06F 3/16 |
| 2018/0173971 | A1* | 6/2018 | Jia ........................... G06F 18/25 |
| 2018/0336463 | A1* | 11/2018 | Bloom ...................... G06N 3/08 |
| 2018/0367192 | A1 | 12/2018 | O'Shea et al. |
| 2019/0014488 | A1 | 1/2019 | Tan et al. |
| 2019/0150006 | A1 | 5/2019 | Yang et al. |
| 2019/0165894 | A1 | 5/2019 | Choi et al. |
| 2019/0171932 | A1* | 6/2019 | Chen ....................... G06N 3/045 |
| 2019/0188818 | A1 | 6/2019 | Luo et al. |
| 2019/0251402 | A1* | 8/2019 | Godwin, IV .......... G06F 18/285 |

FOREIGN PATENT DOCUMENTS

| | | | | |
|---|---|---|---|---|
| DE | 102013208643 | A1 * | 11/2013 | ............. B60R 25/00 |
| KR | 10-0819285 | B1 | 4/2008 | |
| KR | 10-1033532 | B1 | 5/2011 | |
| KR | 10-2018-0080122 | A | 7/2018 | |
| KR | 10-1882260 | B1 | 7/2018 | |
| KR | 10-2019-0098043 | A | 8/2019 | |
| WO | 2018/195847 | A1 | 11/2018 | |
| WO | 2021/173579 | A1 | 9/2021 | |

OTHER PUBLICATIONS

Ye, Jul. 2019, "Circular Convolutional Auto-Encoder for Channel Coding" (Year: 2019).*
Felix et al, 2018, "OFDM-Autoencoder for End-to-End Learning of Communications Systems" (Year: 2018).*
Liao et al., "CSI Feedback Based on Deep Learning for Massive MIMO Systems", Jul. 12, 2019, 11 pages.
Supplementary European Search Report dated Jul. 8, 2022 in connection with European Patent Application No. 20 87 5296, 10 pages.
International Search Report dated Dec. 21, 2020 in connection with International Patent Application No. PCT/KR2020/012950, 3 pages.
Communication pursuant to Article 94(3) EPC dated May 3, 2024, in connection with European Patent Application No. 20875296.4, 5 pages.
The First Office Action dated Mar. 29, 2024, in connection with Chinese Application No. 202080070869.7, 16 pages.
Office Action dated Aug. 13, 2024, in connection with Korean Application No. 10-2019-0125623, 10 pages.
Wen, et al., "Deep Learning for Massive MIMO CSI Feedback," IEEE Wireless Communications Letters, vol. 7, No. 5, Oct. 2018, 4 pages.
The Second Office Action dated Nov. 18, 2024, in connection with Chinese Application No. 202080070869.7, 9 pages.

* cited by examiner

METHOD AND APPARATUS FOR TRANSCEIVING SIGNAL USING ARTIFICIAL INTELLIGENCE IN WIRELESS COMMUNICATION SYSTEM

CROSS-REFERENCE TO RELATED APPLICATION

This application is based on and claims priority under 35 U.S.C. 119 from Korean Patent Application No. 10-2019-0125623, filed on Oct. 10, 2019, in the Korean Intellectual Property Office, the disclosure of which is herein incorporated by reference in its entirety.

BACKGROUND

1. Field

The disclosure relates to a method and apparatus for transmitting or receiving a signal including channel information using deep learning and artificial intelligence in a wireless communication system.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Studies on signal transmission or reception methods using an artificial neural network are being conducted in association with the communication between a user equipment (UE) and a base station (BS) in a communication system.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method and apparatus for transmitting or receiving information accurately using a limited number of bits during communication performed between a user equipment (UE) and a base station (BS) in a communication system.

In accordance with an aspect of the disclosure, a method of transmitting or receiving a signal by a user equipment (UE) in a mobile communication system may include: identifying a neural network model for transmitting first information to a base station (BS); learning a connection weight of the neural network model using the first information; transmitting, to the base station, second information for updating a weight of a second partial neural network corresponding to the base station based on a result of the learning; and updating a weight of a first partial neural network corresponding to the UE based on the result of the learning.

In accordance with an aspect of the disclosure, a method of transmitting or receiving a signal by a BS in a mobile communication system may include: identifying a neural network model for receiving first information from a UE; receiving, from the UE, second information for updating a weight of a second partial neural network corresponding to the BS; and updating the weight of the second partial neural network based on the second information.

In accordance with an aspect of the disclosure, a UE which transmits or receives a signal in a mobile communication system may include: a transceiver, configured to transmit or receive a signal; and a controller, configured to: identify a neural network model for transmitting first information to a BS, learn a connection weight of the neural network model using the first information, transmit, to the BS, second information for updating a weight of a second partial neural network corresponding to the BS based on a result of the learning, and update a weight of a first partial neural network corresponding to the UE based on the result of the learning.

In accordance with an aspect of the disclosure, a BS which transmits or receives a signal in a mobile communication system, may include: a transceiver configured to transmit or receive a signal; and a controller configured to: identify a neural network model for receiving first information from a UE, receive second information for updating a weight of a second partial neural network corresponding to the BS from the UE, and update a weight of a second partial neural network based on the second information.

According to various embodiments, information to be transmitted or received can be accurately delivered via an artificial neural network using a limited number of bits.

According to various embodiments, deterioration in the performance of an artificial neural network can be alleviated, and overhead associated with learning can be decreased.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts, and wherein.

DETAILED DESCRIPTION

Figure 1:
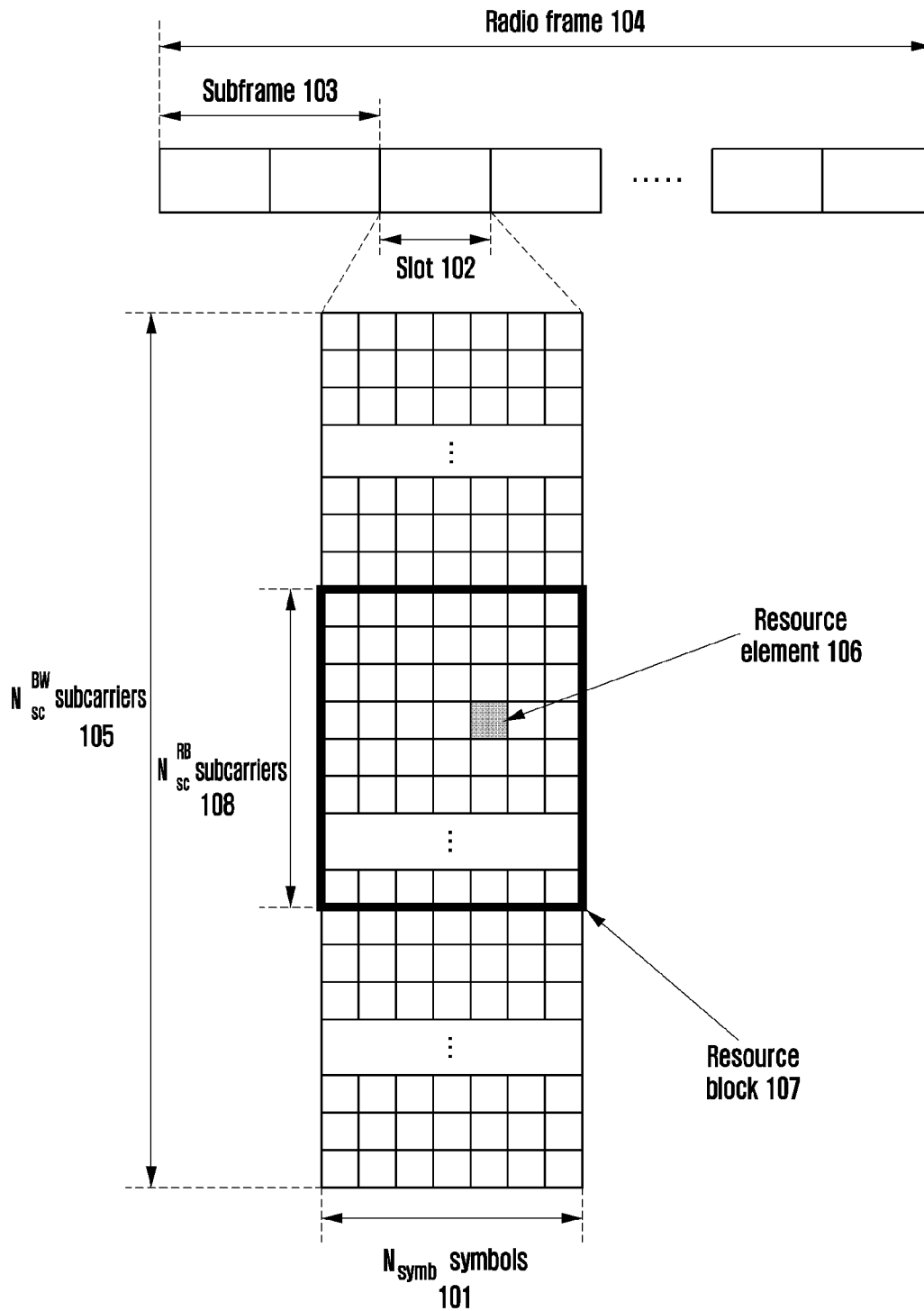
FIG. 1 illustrates a diagram illustrating the basic structure of the time-frequency domain, which is a radio resource region in which data or a control channel is transmitted in an LTE system.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

A wireless communication system has developed into a broadband wireless communication system that provides high-speed and high-quality packet data service, like the communication standards, for example, high-speed packet access (HSPA) of 3GPP, long-term evolution (LTE) or evolved universal terrestrial radio access (E-UTRA), LTE-advanced (LTE-A), LTE-Pro, high-rate packet data (HRPD) of 3GPP2, ultra-mobile broadband (UMB), and 802.16e of IEEE, or the like, beyond the voice-based service provided initially.

An LTE system, which is a representative example of a broadband wireless communication system, employs an orthogonal frequency-division multiplexing (OFDM) scheme for a downlink (DL), and employs a single-carrier frequency-division multiple access (SC-FDMA) scheme for an uplink (UL). An uplink refers to a wireless link via which a terminal (a user equipment (UE) or a mobile station (MS)) transmits data or a control signal to a base station (an eNode B or a base station (BS)). A downlink refers to a wireless link via which a BS transmits data or a control signal to a UE. The multiple access scheme described above may allocate or manage time-frequency resources through which data or control information is carried for each user so as not to overlap one another, that is, to have orthogonality therebetween, thereby distinguishing data or control information of each user.

A communication system beyond LTE, that is, a 5G communication system, needs to freely support various requirements from a user, a service provider, and the like, and thus, service that simultaneously satisfies various requirements needs to be supported. Services considered for the 5G communication system may include enhanced mobile broadband (eMBB), massive machine-type communication (mMTC), ultra-reliable low-latency communication (URLLC), and the like.

eMBB aims at providing a data transmission rate surpassing the data transmission rate supported by legacy LTE, LTE-A, or LTE-pro. For example, in the 5G communication system, eMBB needs to provide a maximum of a 20 Gbps peak data rate in a downlink and a maximum of a 10 Gbps peak data rate in an uplink from the perspective of a single BS. Also, the 5G communication system needs to provide an enhanced user-perceived UE data rate together with a peak data rate. In order to satisfy the requirements, there is a desire to improve various transmission or reception technologies including an advanced multi-input multi-output (MIMO) transmission technology. Also, LTE transmits a signal using a maximum 20 MHz transmission bandwidth in the 2 GHz band used by LTE at present. However, the 5G communication system uses a frequency bandwidth wider than 20 MHz in a frequency band ranging from 3 to 6 GHz or in a frequency band greater than or equal to 6 GHz, and thus the data transmission rate required by the 5G communication system may be satisfied.

Also, in the 5G communication system, using mMTC is considered in order to support application services such as the Internet of Things (IoT). mMTC is required to support access of a large number of UEs within a cell, improve the coverage area of a UE, increase battery life expectancy, reduce the cost of a UE, and the like, in order to effectively provide IoT. The Internet of Things (IoT) provides a communication function via attachment to various sensors and various devices, and thus a large number of UEs (e.g., 1,000,000 UEs/km2) needs to be supported within a cell. Also, a UE that supports mMTC has a high probability of being located in a shadow area that a cell cannot cover, such as the basement of a building, due to the characteristics of the service, and may require a coverage area wider than those of other services of the 5G communication system. The UE that supports mMTC needs to be manufactured as an inexpensive UE, and the battery of the UE may not be changed frequently. Accordingly, a long battery lifetime, such as 10 to 15 years, may be required.

URLLC is a cellular-based wireless communication service which is used for the mission-critical purpose. For example, a remote control service for a robot or machinery, an industrial automation service, an unmanned aerial vehicle service, a remote health care service, an emergency alert service, and the like may be considered. Therefore, communication provided by the URLLC may need to provide significantly low latency and significantly high reliability. For example, the service that supports URLLC needs to exhibit an air interface latency less than 0.5 milliseconds, and at the same time, needs to satisfy a packet error rate less than or equal to 10-5. Therefore, for the service that supports URLLC, the 5G system needs to provide a transmission time interval (TTI) smaller than those of other services, and is simultaneously required to allocate wide resources in a frequency band in order to secure reliability of a communication link.

The three services in 5G, that is, eMBB, URLLC, and mMTC, may be multiplexed and transmitted in a single system. In this instance, in order to satisfy different requirements of the services, transmission or reception schemes and transmission or reception parameters that differ among the services may be used.

Hereinafter, the frame structure of LTE and LTE-A systems will be described in detail with reference to the appended drawings.

FIG. 1 illustrates a diagram illustrating the basic structure of the time-frequency domain, which is a radio resource region in which data or a control channel is transmitted in an LTE system.

Referring to FIG. 1, the horizontal axis is the time domain, and the vertical axis is the frequency domain. In the time domain, the minimum transmission unit is an OFDM symbol. One slot 102 includes Nsymb OFDM symbols 101, and one subframe 103 includes two slots. The length of one slot is 0.5 ms, and the length of one subframe is 1.0 milliseconds (ms). A radio frame 104 is a time-domain unit including 10 subframes. In the frequency domain, the minimum transmission unit is a subcarrier. The entire system transmission bandwidth includes a total of NBW subcarriers 105. In the time-frequency domain, the basic resource unit is a resource element (RE) 106, and an RE is expressed by an OFDM symbol index and a subcarrier index. A resource block (RB) (or physical resource block (PRB) 107 is defined by Nsymb consecutive OFDM symbols 102 in the time domain and NRB consecutive subcarriers 108 in the frequency domain. Therefore, one RB 108 includes Nsymb× NRB REs 106. Generally, the minimum transport unit of data is an RB. In the LTE system, Nsymb=7 and NRB=12, and NBW and NRB may be proportional to the bandwidth of a system transmission band.

Subsequently, downlink control information (DCI) in LTE and LTE-A systems will be described in detail.

In an LTE system, scheduling information associated with downlink data or uplink data is transferred from a BS to a UE via DCI. DCI operations may be performed by defining various formats and applying a corresponding DCI format, depending on whether scheduling information is associated with uplink data or downlink data, whether the size of control information is that of compact DCI, which is small, whether spatial multiplexing, which uses multiple antennas, is applied, whether DCI is for power control, and the like. For example, DCI format 1, which is scheduling control information associated with downlink data, may be configured to include at least the following control information.

Resource allocation type 0/1 flag: indicates whether a resource allocation scheme is type 0 or type 1. Type 0 applies a bitmap scheme and allocates resources in units of resource block groups (RBG). In the LTE system, a basic scheduling unit is a resource block (RB), expressed by time-and-frequency-domain resources, and an RBG includes a plurality of RBs and is used as a basic scheduling unit in the type 0 scheme. Type 1 allows allocation of a predetermined RB in an RBG.

Resource block assignment: indicates the RB allocated for data transmission. A resource to be expressed is determined according to the system bandwidth and resource allocation scheme.

Modulation and coding scheme (MCS): indicates a modulation scheme used for data transmission and the size of a transport block, which is data to be transmitted.

HARQ process number: indicates the process number of HARQ.

New data indicator: indicates HARQ initial transmission or HARQ retransmission.

Redundancy version: indicates the redundancy version of HARQ.

Transmit power control (TPC) command for physical uplink control channel (PUCCH): indicates a transmission power control command for a PUCCH, which is an uplink control channel.

The DCI is transmitted via a physical downlink control channel (PDCCH) after a channel-coding and modulation process.

A cyclic redundancy check (CRC) is added to the payload of a DCI message, and the CRC may be scrambled with a radio network temporary identifier (RNTI) corresponding to a UE identity. Different RNTIs may be used depending on the purpose of the DCI message, for example, UE-specific data transmission, power control command, random-access response, or the like. That is, an RNTI is not transmitted explicitly, but is transmitted by being included in a CRC calculation process. If a UE receives a DCI message transmitted on a PDCCH, the UE may identify a CRC using an allocated RNTI. If the CRC identification result is correct, the UE may identify that the corresponding message is transmitted for the UE.

Figure 2:
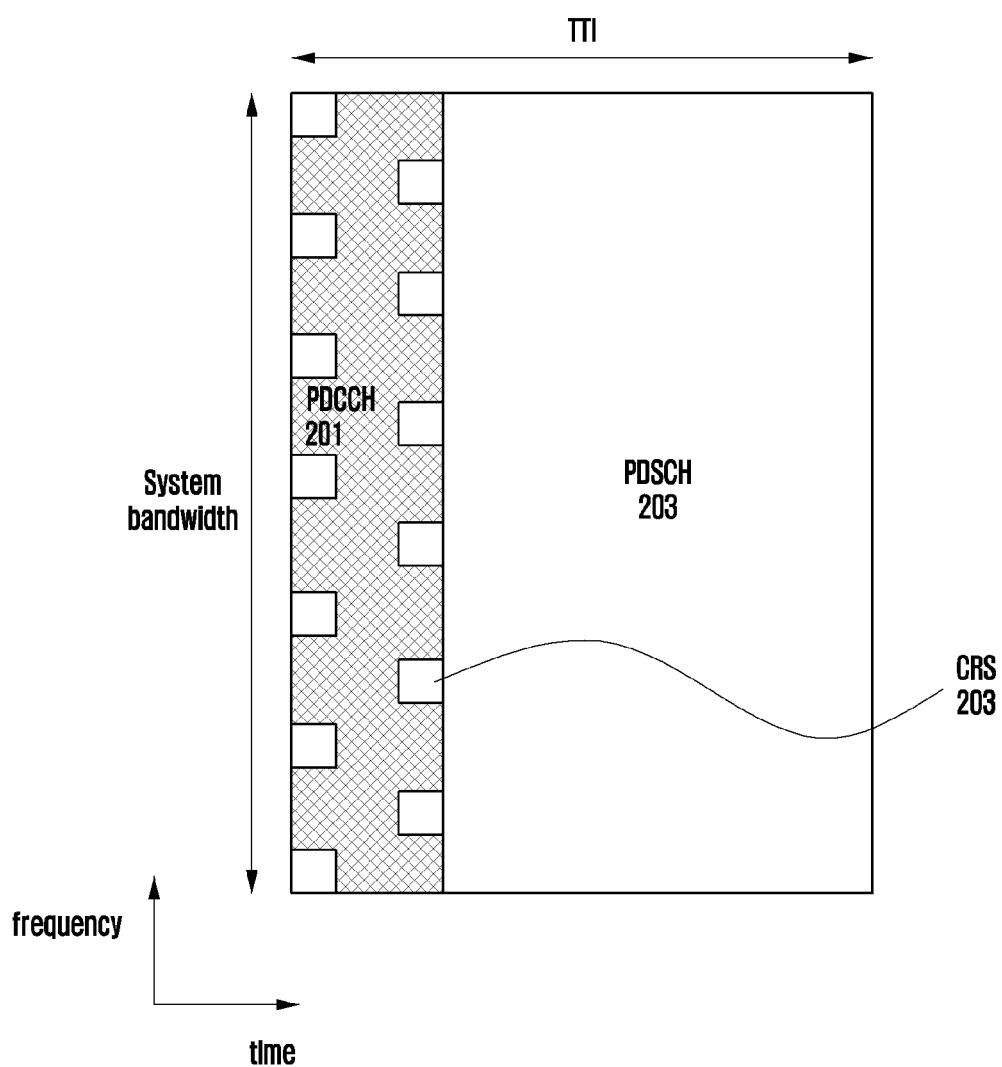
FIG. 2 illustrates a diagram illustrating a PDCCH which is a physical downlink channel on which DCI of LTE is transmitted.

FIG. 2 illustrates a diagram illustrating a PDCCH 201, which is a physical downlink channel on which DCI of LTE is transmitted.

Referring to FIG. 2, the PDCCH 201 is time-multiplexed with a PDSCH 202, which is a data transmission channel, and is transmitted over the entire system bandwidth. The region of a PDCCH 201 is expressed as the number of OFDM symbols, which is indicated to a UE using a control format indicator (CFI) transmitted via a physical control format indicator channel (PCFICH). By allocating the PDCCH 201 to OFDM symbols existing in the front part of a subframe, a UE is capable of decoding downlink scheduling allocation as promptly as possible. Accordingly, a downlink shared channel (DL-SCH) decoding latency, that is, the overall downlink transmission latency, may be reduced. A single PDCCH delivers a single DCI message, and a plurality of UEs may be scheduled simultaneously in a downlink and an uplink, and thus transmission of a plurality of PDCCHs may be performed in parallel in each cell. A cell-specific reference signal (CRS) 203 is used as a reference signal for decoding the PDCCH 201. The CRS 203 is transmitted for each subframe over the entire band, and scrambling and resource mapping may be different for each cell identity (ID). The CRS 203 is a reference signal used by all UEs in common, and thus UE-specific beamforming may not be applied. Therefore, the multi-antenna transmission scheme for a PDCCH of LTE may be limited to an open-loop transmission diversity scheme. The UE implicitly obtains the number of ports of a CRS by decoding a physical broadcast channel (PBCH).

The resource allocation of the PDCCH 201 is performed in units of control-channel elements (CCE), and a single CCE includes 9 resource element groups (REG), that is, a total of 36 resource elements (REs). The number of CCEs required for the predetermined PDCCH 201 may be 1, 2, 4, or 8, which is determined based on the channel-coding rate of a DCI message payload. As described above, a different number of CCEs may be used to implement link adaptation of the PDCCH 201. The UE needs to detect a signal without knowing information associated with the PDCCH 201. In LTE, a search space indicating a set of CCEs is defined for blind decoding. The search space includes a plurality of sets according to each CCE aggregation level (AL), which is not explicitly signaled but is implicitly defined by a subframe number and a function associated with a UE identity. In each subframe, a UE decodes the PDCCH 201 with respect to all possible resource candidates that may be selected from CCEs in the configured search space, and processes information that is declared to be valid to the corresponding UE via CRC check.

The search space may be classified as a UE-specific search space and a common search space. A group of UEs or all UEs may search the common search space of the PDCCH 201 in order to receive cell-common control information such as a dynamic scheduling or paging message associated with system information. For example, scheduling allocation information of a DL-SCH for transmission of system information block (SIB)-1 including cell operator information or the like may be received by searching the common search space of the PDCCH 201.

In LTE, the entire PDCCH region is configured as a set of CCEs in the logical region, and a search space including a set of CCEs is present. A search space may be classified as a common search space and a UE-specific search space, and the search space for an LTE PDCCH may be defined as follows.

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| Common | 4 | 8 | 2 |
| | 8 | 16 | 2 |
| | 4 | 16 | 4 |
| | 8 | 16 | 2 |

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by
$L \{(Y_k + m') \mod \lfloor N_{CCE,k} / L \rfloor\} + i$
where $Y_k$ is defined below, $i = 0, \ldots, L-1$. For the common search space $m' = m$. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value; else if the monitoring UE is not configured with carrier indicator field, then $m' = m$, where $m = 0, \ldots, M^{(L)} - 1$. $M^{(L)}$ is the number of PDCCH candidates to monitor in the given search space.
Note that the carrier indicator field value is the same as ServCellIndex.
For the common search spaces, $Y_k$ is set to 0 for the two aggregation levels $L = 4$ and $L = 8$.
For the UE-specific search space $S_k^{(L)}$ at aggregation level L, the variable $Y_k$ is defined by
$Y_k = (A \cdot Y_{k-1}) \mod D$
where $Y_{-1} = n_{RNTI} = 0$, $A = 39827$, $D = 65537$ and $k = \lfloor n_s/2 \rfloor$, $n_s$ is the slot number within a radio frame.
The RNTI value used for $n_{RNTI}$ is defined in subclause 7.1 in downlink and subclause 8 in uplink.

According to the above-mentioned definition of the search space for a PDCCH, the UE-specific search space is not explicitly signaled but is defined implicitly by a subframe number and a function associated with a UE identity. In other words, the fact that a UE-specific search space is changed depending on a subframe number means that the UE-specific search space may be changed over time. Through the above, a problem (a blocking problem) in which a predetermined UE is incapable of using a search space due to other UEs may be overcome. A UE may not be scheduled in a subframe since all CCEs that the UE searches are currently used by other scheduled UEs within the same subframe. However, since the search space is changed over time, this problem does not occur in a subsequent subframe. For example, although UE-specific search spaces of UE #1 and UE #2 partially overlap in a predetermined subframe, the overlap may be expected to be different in a subsequent subframe since a UE-specific search space is different for each subframe.

According to the above-described definition of the search space for a PDCCH, a common search space is defined as a set of CCEs agreed upon in advance since a group of UEs or all UEs need to receive a PDCCH. In other words, the common search space is not changed depending on a UE identity, a subframe number, or the like. Although the common search space is present for transmission of various system messages, the common search space may be used for transmitting control information of an individual UE. Through the above, the common search space may be used as a solution for the phenomenon in which a UE is not scheduled due to the lack of available resources in a UE-specific search space.

A search space is a set of candidate control channels including CCEs that a UE is supposed to attempt to decode on a given aggregation level. There are various aggregation levels for binding one, two, four, and eight CCEs into a single bundle, and thus a UE has multiple search spaces. In an LTE PDCCH, the number of PDCCH candidates that are to be monitored by a UE in a search space and are defined based on an aggregation level is defined in the table below.

According to Table 1, in the case of a UE-specific search space, aggregation levels $\{1, 2, 4, 8\}$ are supported, and in this instance, there are $\{6, 6, 2, 2\}$ PDCCH candidates, respectively. In the case of a common search space 302, aggregation levels $\{4, 8\}$ are supported, and in this instance, there are $\{4, 2\}$ PDCCH candidates, respectively. The common search space supports only aggregation levels $\{4, 8\}$ in order to improve coverage characteristics, since a system message generally needs to arrive at the edge of a cell.

DCI transmitted in the common search space is defined only for a predetermined DCI format, such as 0/1A/3/3A/1C, corresponding to the purpose of power control or the like for a UE group or a system message. In the common search space, a DCI format involving spatial multiplexing is not supported. A downlink DCI format which is supposed to be decoded in a UE-specific search space may be changed depending on the transmission mode configured for the corresponding UE. The transmission mode is configured via RRC signaling, and thus a subframe number is not accurately defined in association with whether the corresponding configuration is effective for the corresponding UE. Therefore, the UE always performs decoding with respect to DCI format 1A, irrespective of the transmission mode, so as to operate in a manner in which communication is not lost.

In the above description, a method of transmitting or receiving a downlink control channel and downlink control information and a search space in legacy LTE and LTE-A have been described.

Hereinafter, a downlink control channel in the 5G communication system which is currently under discussion will be described in detail with reference to drawings.

Figure 3:
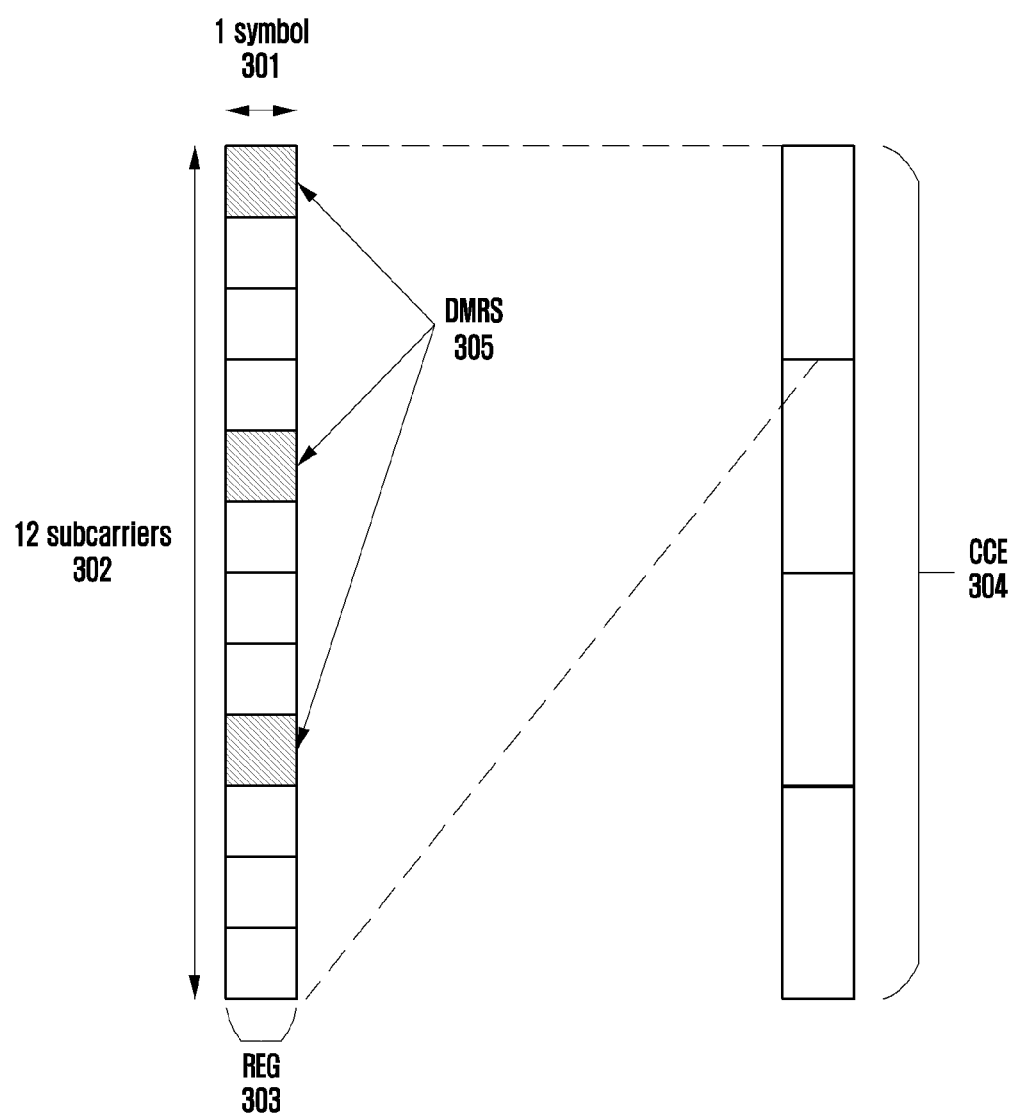
FIG. 3 illustrates a diagram illustrating an example of the basic unit of time and frequency resources configured for a downlink control channel usable in 5G.

FIG. 3 illustrates a diagram illustrating an example of the basic unit of time and frequency resources configured for a downlink control channel usable in 5G. According to FIG. 3, the basic unit (REG) of time and frequency resources configured for a control channel includes one OFDM symbol 301 on the time axis, and 12 subcarriers 302, that is, 1 RB, on the frequency axis. By assuming 1 OFDM symbol 301 as a basic time-axis unit when configuring the basic unit of a control channel, a data channel and a control channel may be time-multiplexed within a single subframe. By placing a control channel before a data channel, the processing time perceived by a user may be reduced, and thus, a latency requirement may be easily satisfied. The basic frequency-axis unit of a control channel is set to 1 RB 302, and thus frequency multiplexing between a control channel and a data channel may be effectively performed.

By concatenating REGs 303 illustrated in FIG. 3, a control channel region may be configured in various sizes. For example, when the CCE 304 is a basic unit for allocation of a downlink control channel in 5G, 1 CCE 304 may include a plurality of REGs 303. A description will be provided with reference to the REG 303 of FIG. 3. If the REG 303 includes 12 REs and 1 CCE 304 includes 6 REGs 303, this means that 1 CCE 304 includes 72 REs. If a downlink control region is configured, the corresponding region includes a plurality of CCEs 304, and a predetermined control channel may be transmitted by being mapped to a single CCE or to multiple CCEs 304 in the control region, depending on the aggregation level (AL). The CCEs 304 in the control region may be distinguished by numbers, and the numbers may be assigned according to a logical mapping scheme.

The basic unit of the downlink control channel of FIG. 3, that is, the REG 303, may include REs to which DCI is mapped and a region to which a demodulation reference signal (DMRS) 305, which is a reference signal for decoding the DCI, is mapped. As illustrated in FIG. 3, the DMRS 305 may be transmitted in 6 REs within 1 REG 303. For reference, the DMRS 303 is transmitted using precoding that is the same as that of a control signal mapped to the REG 303, and thus a UE may be capable of decoding control information without information associated with precoding that a base station uses.

Figure 4:
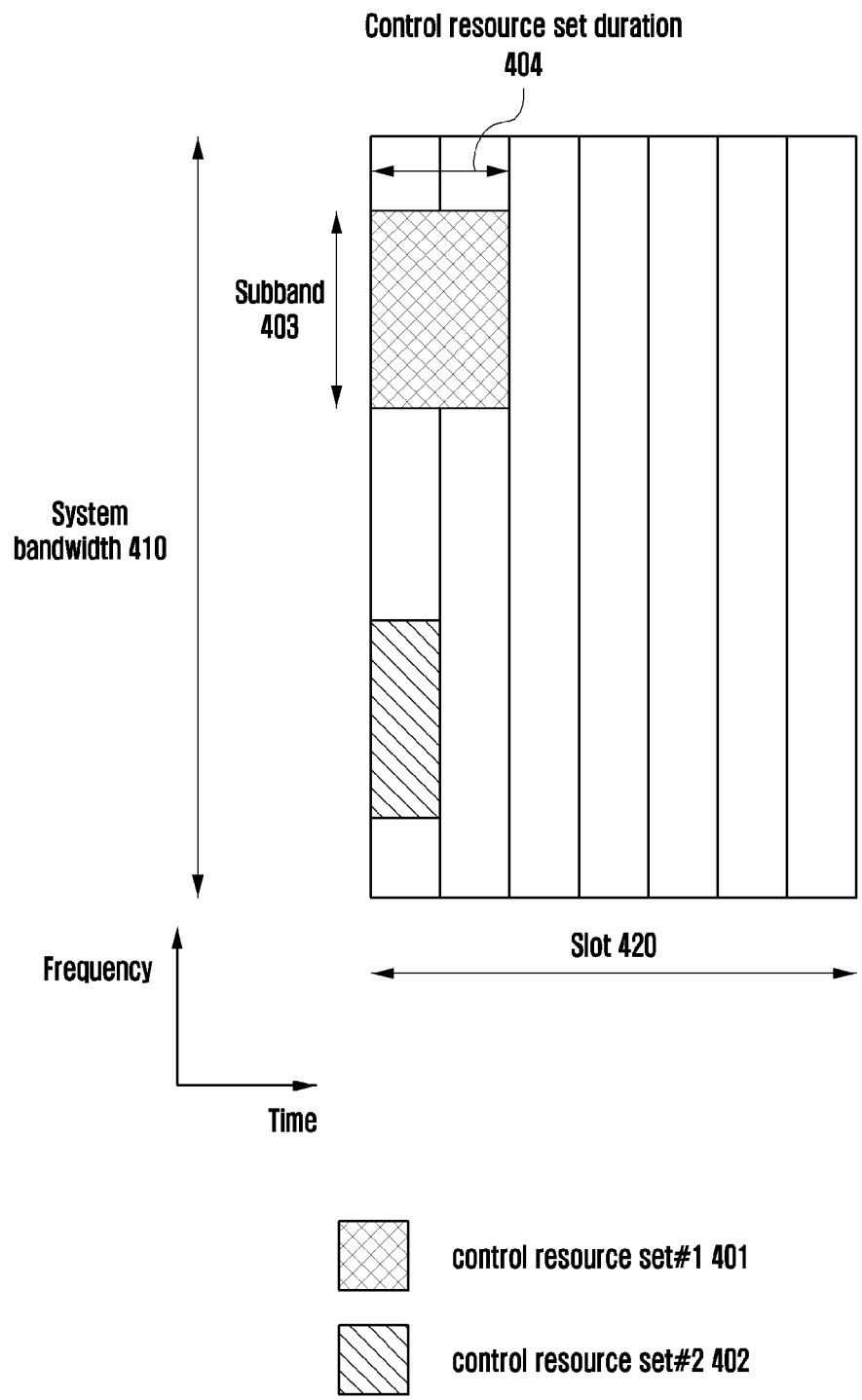
FIG. 4 illustrates a diagram illustrating an example of a control region (a control resource set (CORESET)) in which a downlink control channel is transmitted in a 5G wireless communication system.

FIG. 4 illustrates a diagram illustrating an example of a control region (a control resource set (CORESET)) in which a downlink control channel is transmitted in a 5G wireless communication system. In FIG. 4, it is assumed that two control regions (control region #1 401 and control region #2 402) are configured within a system bandwidth 410 on the frequency axis and 1 slot 420 on the time axis (e.g., an example of FIG. 4 assumes that 1 slot includes 7 OFDM symbols). The control region 401 or 402 may be configured based on a predetermined subband 403 of the entire system bandwidth 410 on the frequency axis. On the time axis, the control region may be configured based on one or multiple OFDM symbols, which may be defined as a control region length (control resource set duration 404). In the example of FIG. 4, control region #1 401 is configured based on a control region length of 2 symbols, and control region #2 is configured based on a control region length of 1 symbol.

The control region in 5G, as described above, may be configured via higher-layer signaling (e.g., system information, master information block (MIB), RRC signaling) from a BS to a UE. Configuring a control region for a UE is providing information associated with the location of the control region, a subband, resource allocation of the control region, a control region length, and the like. For example, the following information may be included.

TABLE 2

Configuration information 1. frequency axis RB allocation information

Configuration 2. control region start symbol

Configuration 3. control region symbol length

Configuration 4. REG bundling size (2 or 3 or 6)

Configuration 5. transmission mode (interleaved transmission scheme or non-interleaved transmission scheme)

Configuration information 6. DMRS configuration information (precoder granularity)

Configuration information 7. search space type (common search space, group-common search space, UE-specific search space)

Configuration information 8. DCI format to be monitored in corresponding control region Other In addition to the above-described configuration information, various types of information required for transmitting a downlink control channel may be configured for a UE.

Next, downlink control information (DCI) in 5G will be described in detail.

In the 5G system, scheduling information associated with uplink data (physical uplink shared channel (PUSCH)) or downlink data (physical downlink shared channel (PDSCH)) may be transferred from a BS to a UE via DCI. The UE may monitor a DCI format for fallback and a DCI format for non-fallback in association with a PUSCH or PDSCH. The fallback DCI format may be implemented as a fixed field between a BS and a UE, and the non-fallback DCI format may include a settable field.

The fallback DCI that schedules a PUSCH may include the information shown below.

TABLE 3

Identifier for DCI formats - [1] bit
Frequency domain resource assignment -$\lceil \log_2 (N_{RB}^{UL,BWP}(N_{RB}^{UL,BWP} +1)/2) \rceil$ bits
Time domain resource assignment - X bits
Frequency hopping flag - 1 bit.
Modulation and coding scheme - [5] bits
New data indicator - 1 bit
Redundancy version - [2] bits
HARQ process number - [4] bits
TPC command for scheduled PUSCH - [2] bits
UL/SUL indicator - 0 or 1 bit The non-fallback DCI that schedules a PUSCH may include the information shown below.

TABLE 4

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits as defined in section x.x of [6, TS38.214]
    HARQ process number - 4 bits
    1st downlink assignment index - 1 or 2 bits
    1 bit for semi-static HARQ-ACK codebook;
    2 bits for dynamic HARQ-ACK codebook with single HARQ-ACK codebook.

TABLE 4-continued

2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits SRS resource indicator $- \left\lceil \log_2\left( \sum_{k=1}^{L_{max}} \binom{N_{SRS}}{k} \right) \right\rceil$ or $\lceil \log_2(N_{SRS}) \rceil$ $\left\lceil \log_2\left( \sum_{k=1}^{L_{max}} \binom{N_{SRS}}{k} \right) \right\rceil$ $\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 2 bits.
beta_offset indicator - 2 bits
DMRS sequence initialization - 0 or 1 bit
UL/SUL indicator - 0 or 1 bit The fallback DCI that schedules a PDSCH may include the information shown below.

TABLE 5-1

Identifier for DCI formats - [1] bit
Frequency domain resource assignment -$\lceil \log_2 (N_{RB}^{DL,BWP}(N_{RB}^{DL,BWP} + 1)/2) \rceil$ bits
Time domain resource assignment - X bits
VRB-to-PRB mapping - 1 bit.
Modulation and coding scheme - [5] bits
New data indicator - 1 bit
Redundancy version - [2] bits
HARQ process number - [4] bits
Downlink assignment index - 2 bits TABLE 5-1-continued TPC command for scheduled PUCCH - [2] bits
PUCCH resource indicator - [2] bits
PDSCH-to-HARQ feedback timing indicator - [3] bits The non-fallback DCI that schedules a PDSCH may include the information shown below.

TABLE 5-2

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,BWP} / P \rceil$ bits
    For resource allocation type 1, $\lceil log2(N_{RB}^{DL,BWP}(N_{RB}^{DL,BWP} + 1)/2) \rceil$ bits
Time domain resource assignment -1, 2, 3, or 4 bits
VRB-to-PRB mapping - 0 or 1 bit, only for resource allocation type 1.
    0 bit if only resource allocation type 0 is configured;
    1 bit otherwise.
PRB bundling size indicator - 1 bit
Rate matching indicator - 0, 1, 2 bits
ZP CSI-RS trigger - X bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0 or 4 bits
TPC command for scheduled PUCCH - 2 bits
PUCCH resource indicator
PDSCH-to-HARQ_feedback timing indicator - 3 bits
Antenna ports - up to 5 bits
Transmission configuration indication - 3 bits
SRS request - 2 bits
CBG transmission information - 0, 2, 4, 6, or 8 bits
CBG flushing out information -0 or 1 bit
DMRS sequence initialization - 0 or 1 bit The DCI may be transmitted via a physical downlink control channel (PDCCH) after a channel-coding and modulation process. A cyclic redundancy check (CRC) is added to the payload of a DCI message, and the CRC may be scrambled with a radio network temporary identifier (RNTI) corresponding to a UE identity. Different RNTIs may be used depending on the purpose of the DCI message, for example, UE-specific data transmission, a power control command, a random-access response, or the like. That is, an RNTI is not explicitly transmitted, but is transmitted by being included in a CRC calculation process. If a UE receives a DCI message transmitted on a PDCCH, the UE may identify a CRC using an allocated RNTI. If the CRC identification result is correct, the UE may identify that the corresponding message is transmitted for the UE.

For example, a DCI that schedules a PDSCH associated with system information (SI) may be scrambled with an SI-RNTI. A DCI that schedules a PDSCH associated with a random-access response (RAR) message may be scrambled with an RA-RNTI. A DCI that schedules a PDSCH associated with a paging message may be scrambled with a P-RNTI. A DCI that reports a slot format indicator (SFI) may be scrambled with an SFI-RNTI. A DCI that reports a transmit power control (TPC) may be scrambled with a TPC-RNTI. A DCI that schedules a UE-specific PDSCH or PUSCH may be scrambled with a cell RNTI (C-RNTI).

Figure 5:
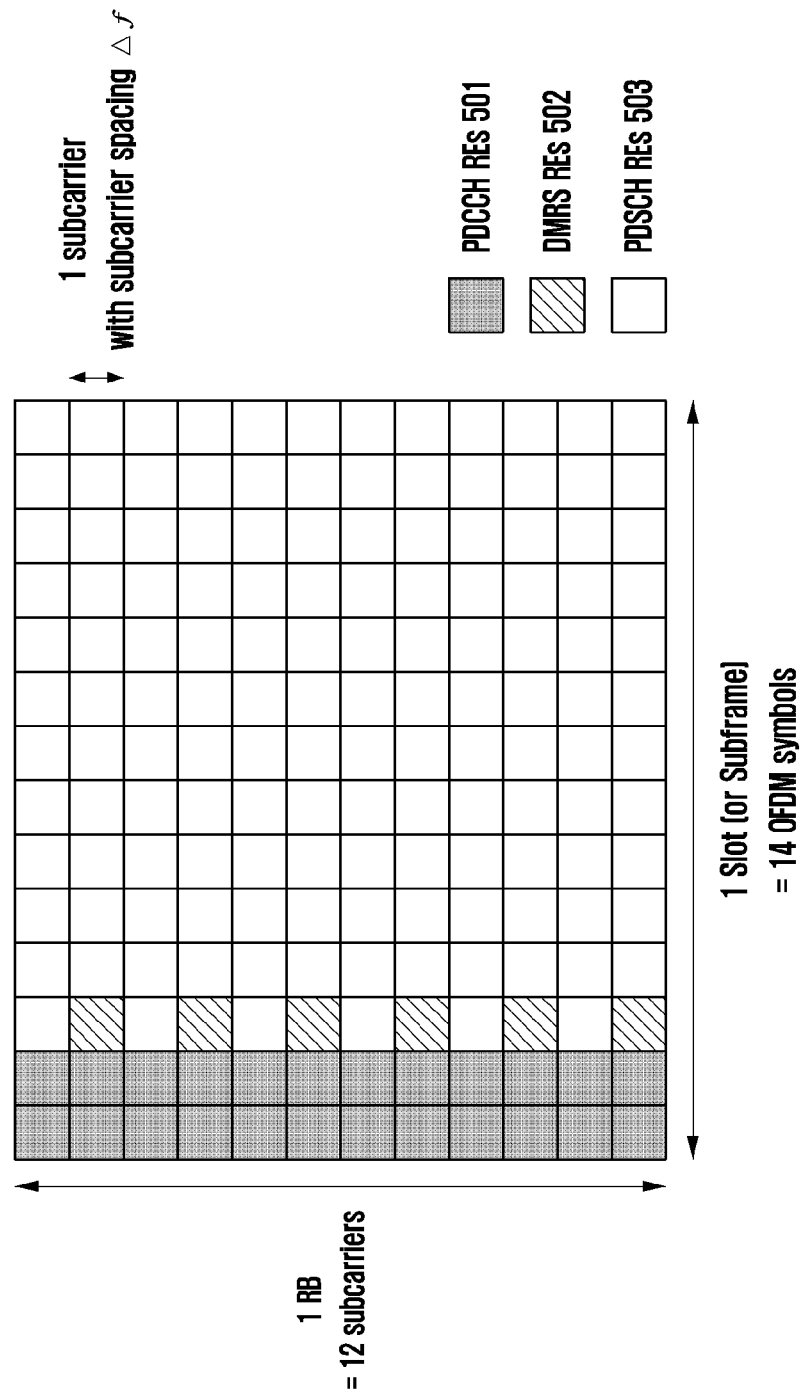
FIG. 5 illustrates a diagram illustrating the case in which 14 OFDM symbols are configured to be used as a single slot (or subframe) in a downlink, a PDCCH is transmitted in first two OFDM symbols, and a DMRS is transmitted in a third symbol.

If a data channel, that is, a PUSCH or PDSCH, is scheduled for a predetermined UE via the PDCCH, data may be transmitted or received together with a DMRS within the corresponding scheduled resource region. FIG. 5 illustrates a diagram illustrating the case in 14 OFDM symbols are configured to be used as a single slot (or subframe) in a downlink, a PDCCH is transmitted in the first two OFDM symbols, and a DMRS is transmitted in a third symbol. In FIG. 5, in a predetermined RB in which a PDSCH is scheduled, the PDSCH is transmitted by mapping data to REs via which a DMRS is not transmitted in a third symbol and REs from the fourth to last symbols. A subcarrier spacing $\Delta f$ expressed in FIG. 5 is 15 kHz in the case of the LTE/LTE-A system, and may be one of {15, 30, 60, 120, 240, 480} kHz in the case of the 5G system.

As described above, a BS needs to transmit a reference signal in order to measure a downlink channel state in a cellular system. In the case of the long-term evolution advanced (LTE-A) system of 3GPP, a UE may measure a channel state between a BS and the UE using a CRS or a CSI-RS transmitted by the BS. The channel state may need to be measured in consideration of various factors, and the amount of interference in a downlink may be one of the factors. The amount of interference in a downlink may include an interference signal generated by an antenna that belongs to a neighboring BS, thermal noise, and the like, and the amount of interference is important when a UE determines a channel state in the downlink. For example, when a BS having a single transmission antenna transmits a signal to a UE having a single reception antenna, the UE needs to determine Es/Io by determining the energy per symbol capable of being received in the downlink and the amount of interference that is to be simultaneously received in the section where the corresponding symbol is received based on a reference signal received from the BS. The determined Ex/Io may be converted into a data transmission rate or a value corresponding thereto, may be transmitted to the BS in the form of a channel quality indicator (CQI), and may be used when the BS determines the data transmission rate to be used for transmission to the UE.

In the case of the LTE-A system, a UE feeds back information associated with a channel state of a downlink to a BS, so the BS utilizes the same for downlink scheduling. That is, the UE measures the reference signal that the BS transmits in the downlink, and feeds back, to the BS, information extracted from the measured reference signal in a form defined in the LTE/LTE-A standard. As described above, the information that the UE feeds back in LTE/LTE-A is referred to as channel state information, and the channel state information may include the following three pieces of information.

- Rand indicator (RI): indicates the number of spatial layers that a UE is capable of receiving in the current channel state.
- Precoding matrix indicator (PMI): an indicator associated with a precoding matrix that a UE prefers in the current channel state.
- Channel quality indicator (CQI): indicates the maximum data rate that a UE is capable of receiving in the current channel state.

The CQI may be replaced with a signal-to-interference-plus-noise ratio (SINR), a maximum error correction code rate and modulation scheme, a data efficiency per frequency, or the like, which may be utilized in a manner similar to a maximum data transmission rate.

The RI, PMI, and CQI are interrelated. For example, a precoding matrix supported in LTE/LTE-A may be defined differently for each rank. Therefore, a PMI value X when an RI is 1 and a PMI value X when an RI is 2 may be interpreted to be different. Also, a UE determines a CQI on the assumption that a PMI and X that the UE reports to a BS are applied in the BS. That is, reporting RI_X, PMI_Y, and CQI_Z to the BS may be reporting that the corresponding UE is capable of performing reception at a data transmission rate corresponding to CQI_Z when a rank is RI_X and a PMI is PMI_Y. As described above, a UE calculates a CQI on the assumption of a transmission scheme to be performed with respect to a BS, so the UE may obtain the optimal performance when the UE actually executes transmission using the corresponding transmission scheme.

In LTE/LTE-A, the RI, PMI, and CQI, which are channel state information that a UE feeds back, may be fed back periodically or aperiodically. In the case in which a BS desires to aperiodically obtain channel state information of a predetermined UE, the BS may configure an aperiodic feedback (or aperiodic channel state information reporting) to be performed using an aperiodic feedback indicator (or a channel-state information request field or channel-state information request information) included in downlink control information (DCI) for the UE. Also, if the UE receives an indicator configured for aperiodic feedback, in an nth subframe, the UE may perform uplink transmission by including aperiodic feedback information (or channel state information) in data transmission in an n+kth subframe. Here, k is a parameter defined in the 3GPP LTE Release 11 standard, which is 4 in frequency-division duplexing (FDD) and may be defined as shown in Table 6 in the case of time-division duplexing (TDD).

TABLE 6 k for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In the case in which aperiodic feedback is configured, feedback information (or channel state information) may include an RI, a PMI, and a CQI, and the RI and the PMI may not be fed back depending on a feedback configuration (or channel state report configuration).

Hereinafter, embodiments of the disclosure will be described in detail with reference to the accompanying drawings. Also, although an embodiment of the disclosure is described with reference to an LTE or LTE-A system, the embodiment of the disclosure may be applicable to other communication systems that have a similar technical background or use a similar channel type. For example, 5G mobile communication technology (5G, new radio (NR)) developed after LTE-A may be included. Also, embodiments of the disclosure may be modified by those skilled in the art without departing from the scope of the disclosure, and may be applied to other communication systems.

In the following description of the disclosure, a detailed description of known functions or configurations incorporated herein will be omitted when the same may make the subject matter of the disclosure rather unclear. The terms which will be described below are terms defined in consideration of the functions in the disclosure, and may be changed according to users, intentions of the users, or customs. Therefore, the definitions of the terms should be made based on the contents throughout the specification.

The disclosure provides a method of efficiently learning and updating a weight of an autoencoder neural network (NN) when an autoencoder, which is a type of deep neural network (DNN), is utilized in signal transmission or reception between a UE and a BS. The training method in the disclosure is referred to as "shadow training".

Figure 6:
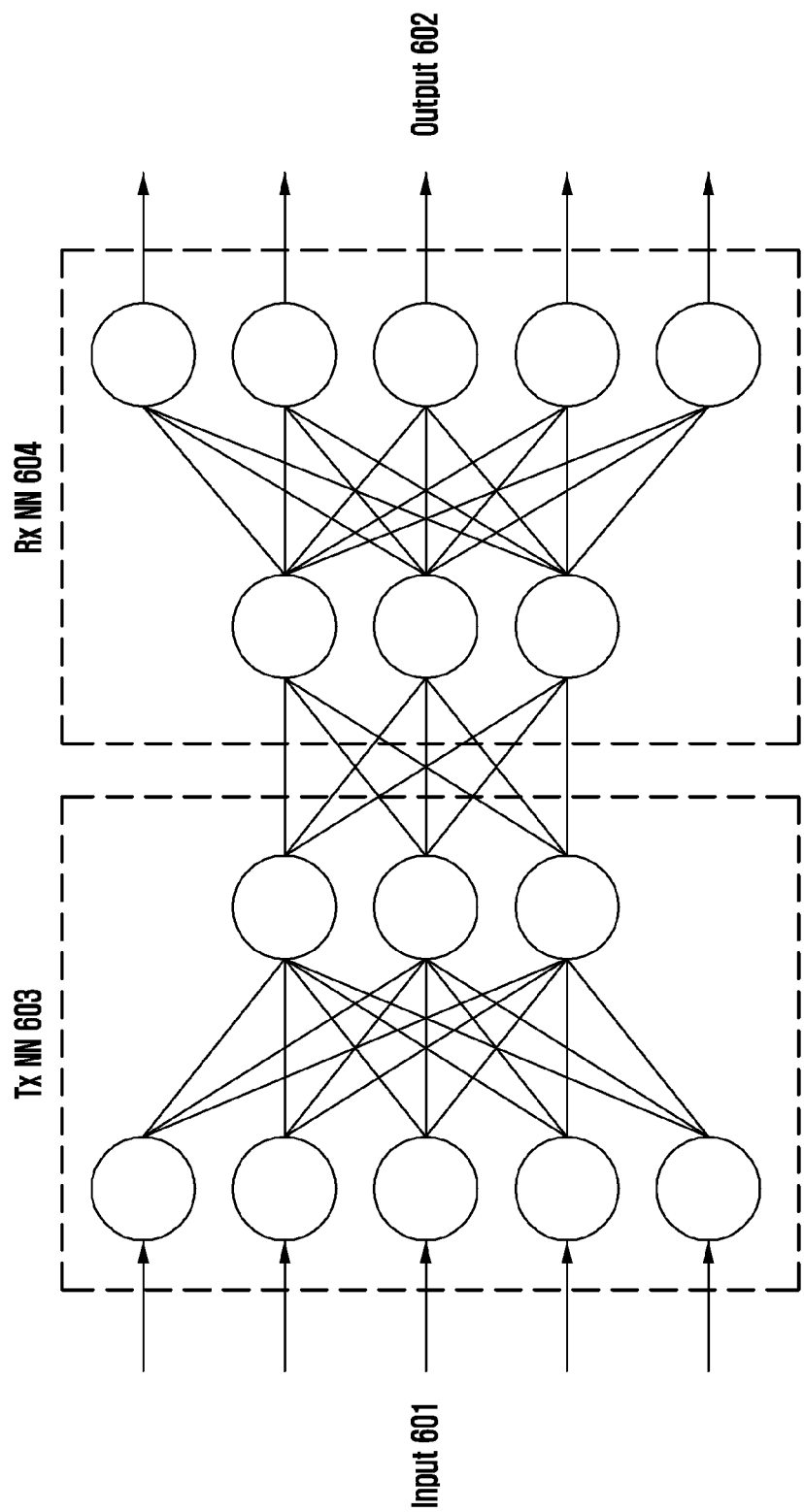
FIG. 6 illustrates the configuration of an autoencoder according to an embodiment.

FIG. 6 illustrates the configuration of an autoencoder according to an embodiment of the disclosure. The autoencoder is a neural network (NN) which is trained in a manner in which an output 602 and an input 601 are identical. According to an embodiment, a signal to be transmitted may be input 601 to the autoencoder NN, and the input signal may be calculated via the trained autoencoder NN and may be output 602. Hereinafter, for ease of description of an embodiment of the disclosure, a downlink or uplink channel matrix is described as input data 601 or output data 602. However, this is merely an example, the description does not limit the scope of the disclosure, and any data may be input or output, like a normal neural network.

The autoencoder NN may be configured to include an input layer, an output layer, and one or more hidden layers, and the autoencoder NN may be defined based on the number of layers, the number of nodes for each layer, and the connection weight between nodes. The connection weight is a value indicating the relationship between nodes, and may be, for example, a real number. The value of each node may be calculated based on the value of another node that is connected to the corresponding node in the NN and a connection weight associated with other nodes. Hereinafter, a "weight" is a connection weight, unless otherwise noted.

According to an embodiment, the autoencoder NN may include a Tx NN 603 including an input layer and an Rx NN 604 including an output layer. The Tx NN 603 may include an input layer and at least one hidden layer, and the Rx NN 604 may include an output layer and at least one hidden layer. The number of hidden layers included in each of the Rx NN 603 and the Tx NN 604 may not always be the same, and the number of hidden layers included in each of the Rx NN 603 and the Tx NN 604 may be different from each other.

According to an embodiment, the autoencoder NN may be configured so that the number of nodes in an input layer and the number of nodes in an output layer are the same, and the number of nodes in the hidden layer is less than the number of input layers and the number of output layers. Therefore, the fact that the autoencoder NN is used may be understood to mean that an input value is encoded in the Tx NN 603 and is decoded in the Rx NN 604.

For ease of description, a description will be made with reference to downlink channel state feedback as an example of signal transmission between a UE and a BS using an autoencoder NN. However, this is merely an example, and the description does not limit the scope of the disclosure. It is clear that the technical idea of the disclosure is applicable to any signal transmission or reception process in a communication system, for example, data transmission or control signal transmission.

Figure 7:
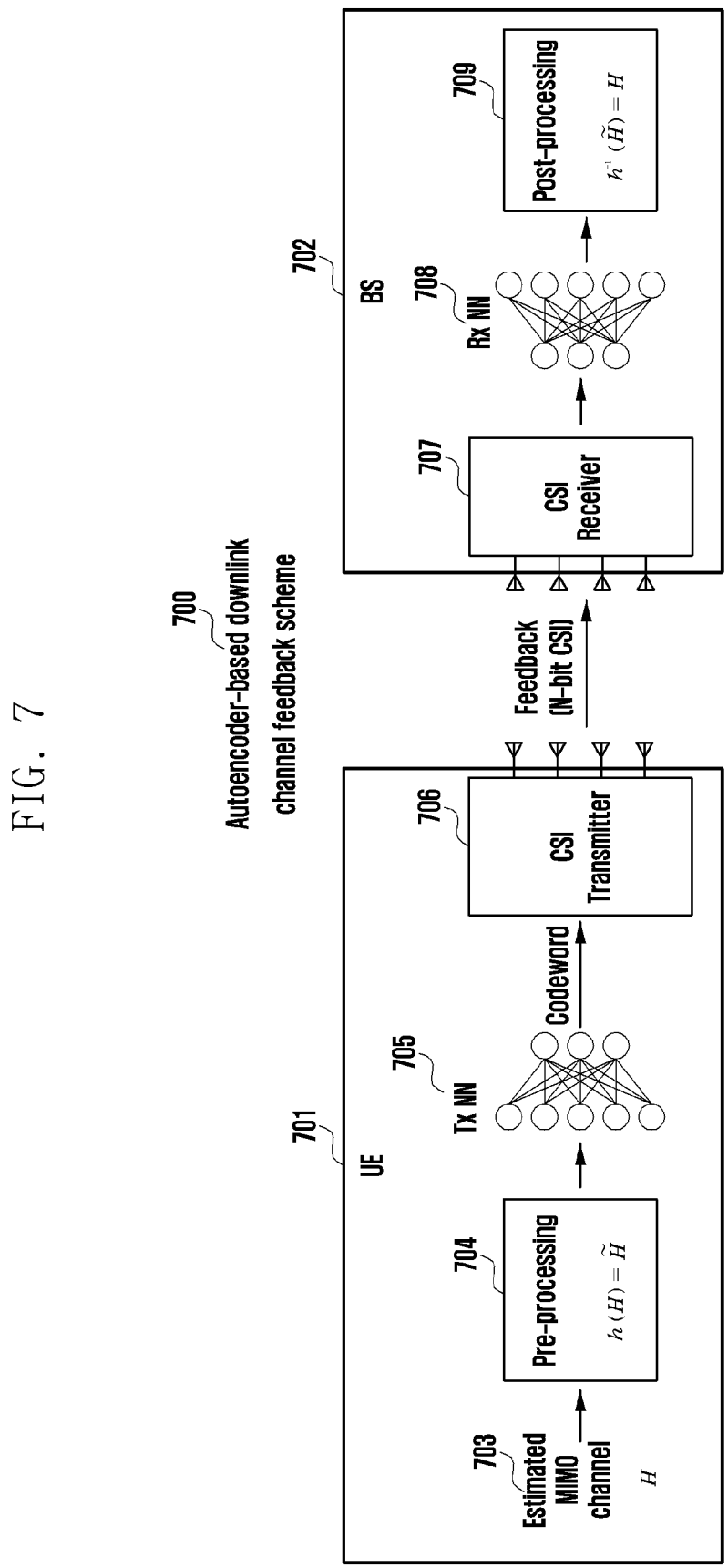
FIG. 7 illustrates a diagram illustrating an autoencoder-based downlink channel feedback scheme 700 according to an embodiment.

FIG. 7 illustrates a diagram illustrating an autoencoder-based downlink channel feedback scheme 700 according to an embodiment. According to the feedback scheme, a Tx NN 705 of the autoencoder NN, which is learned via deep learning, may be disposed in a UE 701, and an Rx NN 708 may be disposed in a BS 702. The UE may perform pre-processing 704 of an estimated downlink channel matrix H 703 so as to produce a new matrix Ĥ. The Tx NN 705 may convert the pre-processed output matrix Ĥ into a codeword vector. The codeword vector is converted into a signal in a form that is transmissible via a CSI transmitter 706, and may be fed back to the BS (CSI report). Feedback may be performed periodically or aperiodically via a PUCCH or a PUSCH. The BS may obtain Ĥ by decoding the codeword vector received via a CSI receiver 707 using the Rx NN 708. The BS may obtain a downlink channel matrix H by performing post-processing 709 Ĥ. This scheme is capable of efficiently encoding information of a channel matrix using deep learning, and thus may be capable of transmitting more accurate channel information using a limited number of feedback bits.

There are two examples of a method of training an autoencoder NN for the channel feedback scheme. First, an offline training method, which learns the weight of an autoencoder NN in advance under predetermined assumed conditions and uses a fixed weight in a real-world situation, may be used. Second, an online training method, which utilizes the weight of an autoencoder NN by learning and updating the weight of the autoencoder NN in real time, may be used. However, in the case of the offline training method, the performance of the autoencoder, which is trained in advance, may deteriorate if the channel environment changes. Also, the online training method may involve high real-time learning complexity and high weight feedback overhead.

In the disclosure, as a method of training an autoencoder NN, a shadow training scheme, which performs training using an autoencoder NN for training that is different from the autoencoder NN actually used by a UE or a BS for signal transmission, and shares the result of training, is provided, and thus an autoencoder NN may be efficiently trained and updated.

First Embodiment

According to the first embodiment, a UE learns a connection weight of an autoencoder NN via shadow training, and transmits information associated with the learned weight to a BS, so that the weight of the autoencoder NN is updated.

Figure 8:
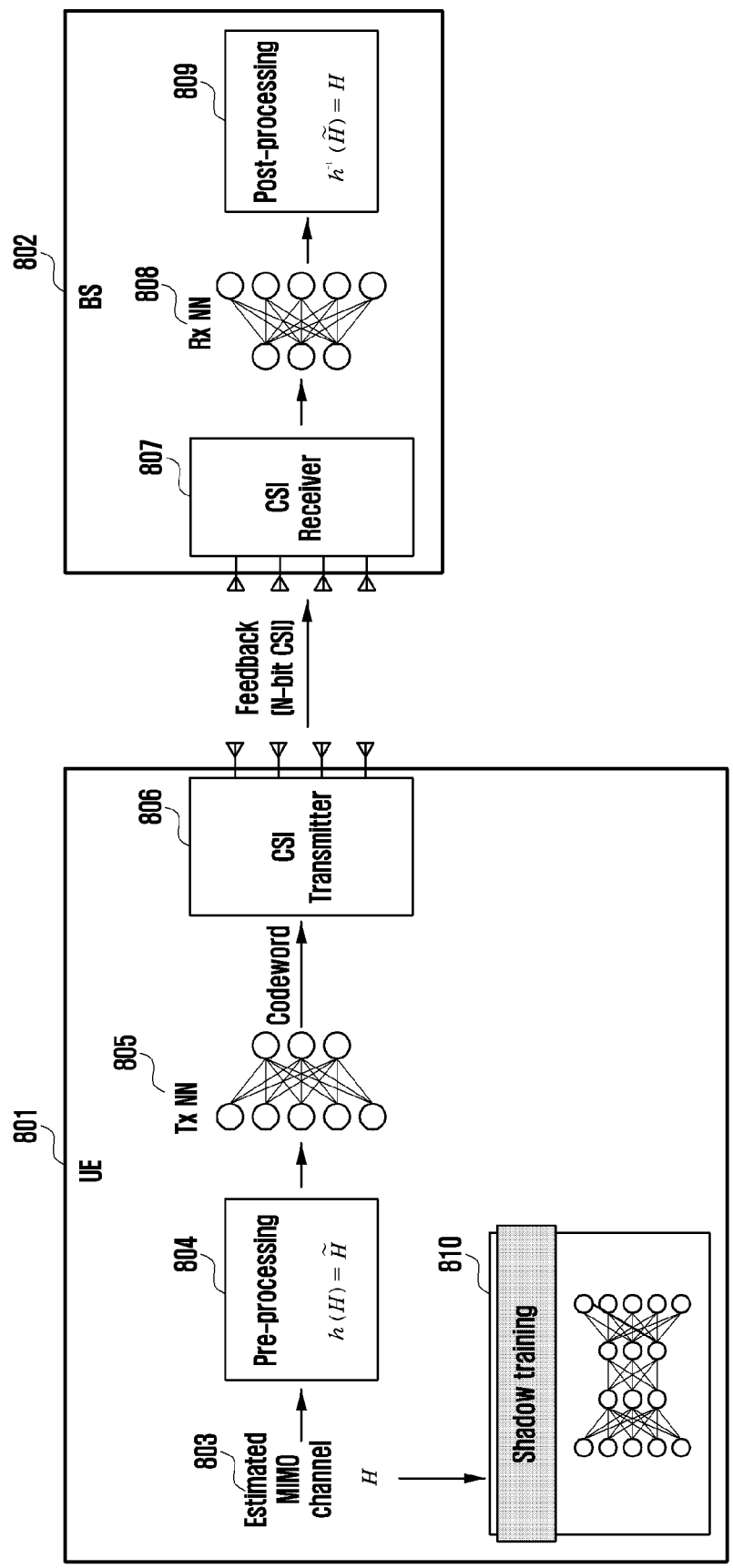
FIG. 8 illustrates a block diagram illustrating the operations of a user equipment (UE) and a base station (BS) according to a first embodiment.
Figure 9:
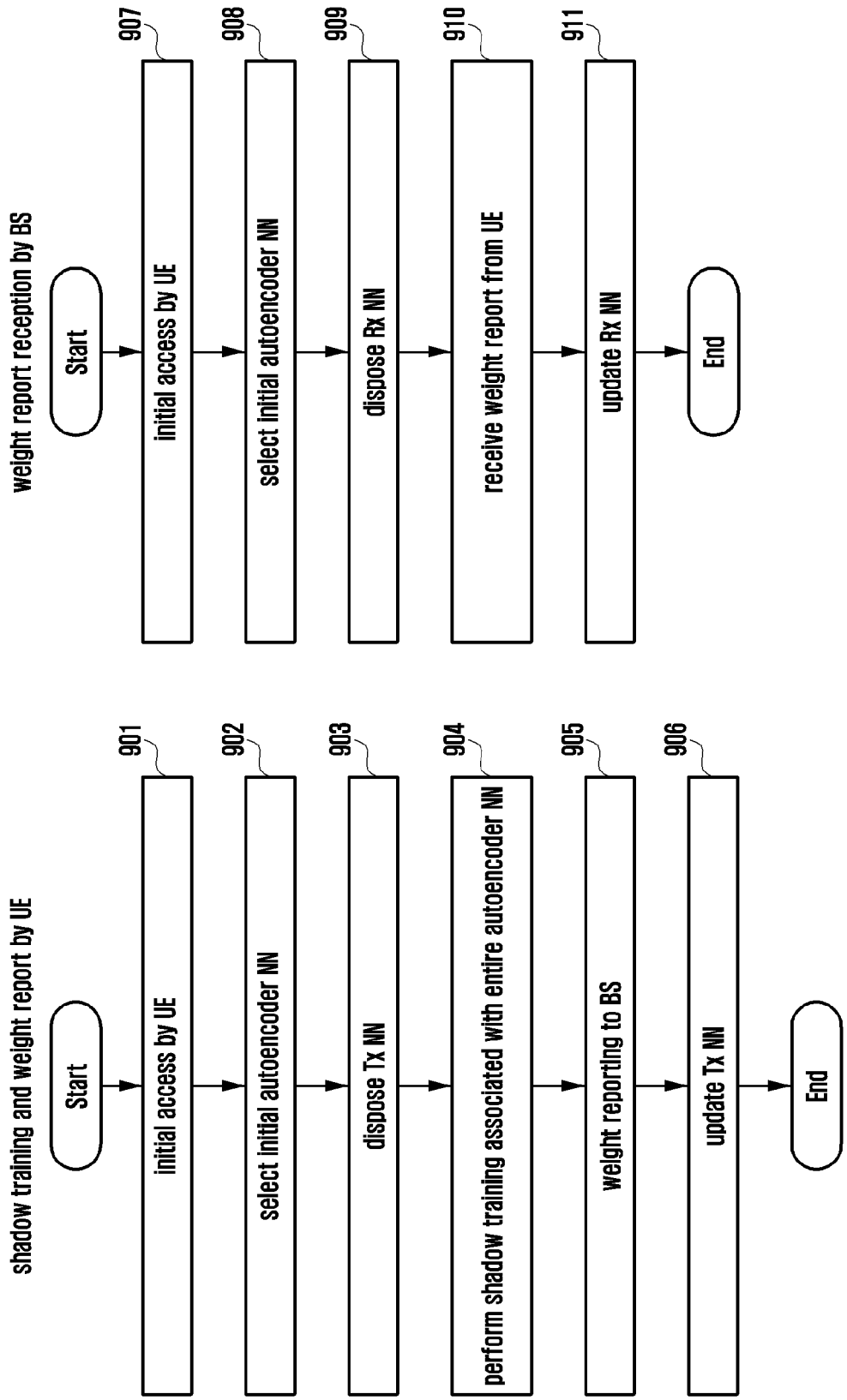
FIG. 9 illustrates a flowchart illustrating the operations of a UE and a BS according to the first embodiment.

FIG. 8 illustrates a diagram illustrating the operations of a UE and a BS according to the first embodiment. FIG. 9 illustrates a diagram illustrating the operations of a UE and a BS according to the first embodiment.

A UE 801 and a BS 802 may share a set of an autoencoder NNs including a limited number of elements which are defined/trained in advance. The set may be a set including one or more autoencoder NNs as elements, and each autoencoder has a structure corresponding to the number of layers and the number of nodes for each layer which are determined based on the physical situation between a UE and a BS. Here, the physical situation may include an operating frequency, a UE bandwidth, an antenna configuration of a UE/BS, or the like. Initial connection weights of respective autoencoder NNs in the set may be learned in advance on the assumption of a predetermined situation.

Each of the UE 801 and the BS 802 may obtain information associated with the physical situation of the other thereof after the initial access 901 and 907, and may select one element from the set of autoencoder NNs in operations 902 and 908. That is, the UE and the BS may select an autoencoder NN having an appropriate structure among a plurality of autoencoder NNs defined/trained in advance based on the obtained information associated with the physical situation after the initial access.

The UE 801 may dispose a Tx NN 805 of the selected autoencoder NN on a UE side in operation 903, and the BS 802 may dispose an Rx N 808 of the selected NN on a BS side in operation 909. In this instance, the BS may dispose, in the base station side, a plurality of Rx NNs different for each of the UEs existing in a cell. The UE 801 and the BS 802 may perform the autoencoder-based downlink channel feedback 700 of FIG. 7 using the Tx NN 805 and the Rx NN 808, respectively disposed therein. Autoencoder-based downlink channel feedback 700 has been described with reference to FIG. 7, and thus a detailed description thereof will be omitted herein.

The UE 801 may prepare an entire autoencoder NN including both a Tx NN and an Rx NN for shadow training, in addition to the Tx NN 805 disposed in the UE. According to an embodiment, the UE may use a downlink channel matrix H 803, which is estimated using a signal received from the BS, as learning data, and may continuously perform shadow training 810 associated with the entire autoencoder NN in operation 904. The signal received from the BS may include, for example, a CRS, a CSI-RS, a synchronization signal, a DMRS, and the like, but is not limited thereto. According to another embodiment, the UE 801 may receive, from the BS 802, a channel matrix estimated using a reference signal that the UE transmits to the BS 802, and may perform shadow training using the estimated channel matrix. The reference signal that the UE 801 transmits to the BS 802 may include, for example, an SRS and a DMRS, but is not limited thereto. That is, the UE 801 may continuously update connection weights of the autoencoder NN, prepared for shadow training, using a channel matrix estimated by the UE based on a signal (a CRS, a CSI-RS, a synchronization signal, a DMRS, . . . ) received from the BS 802 or a channel matrix estimated by the BS and received from the BS, as learning data.

The UE 801 may transmit a weight of an Rx NN (weight report) among weights of the new entire autoencoder NN (Tx NN and Rx NN), updated via shadow training 810, to the BS 802 in operation 905. According to an embodiment, the weight of the Rx NN may be transmitted to the BS via an uplink channel, for example, a PUCCH or a PUSCH.

According to an embodiment, the UE 801 may transmit, to the BS, the weight of the Rx NN, which is updated via periodic weight reporting. In this instance, the period at which the weight of the Rx NN is transmitted may be set in consideration of the amount of time that the UE 801 needs to perform shadow training. Preferably, the period may be set to be longer than a channel state information report period (CSI report period).

According to an embodiment, the UE 801 may transmit, to the BS 802, the weight of the Rx NN, which is updated via aperiodic weight reporting. The UE 801 may perform weight reporting in response to an aperiodic weight report request from the BS 802, or may perform weight reporting if the performance of an autoencoder NN, which performs shadow training, satisfies a predetermined condition. Here, the performance of the autoencoder NN may be defined using an index indicating the degree of a difference between an input and an output of the autoencoder NN. For example, the performance of the autoencoder NN may be defined using a mean squared error (MSE) value between an input and an output. Also, the predetermined condition may be, for example, the condition that the performance of an autoencoder NN is greater than or equal to a predetermined reference, that is, that the difference between an input and an output is less than a predetermined reference. Here, the predetermined reference may be a value determined in advance and input to the UE, or may be a value set arbitrarily by the UE.

A weight report transmitted by the UE 801 may include a request for updating an Rx NN disposed in the BS 802. The BS 802 that receives the weight report may transmit an ACK signal that acknowledges reception of the weight report to the UE 801, and may update the weight of the currently disposed Rx NN 808 to a new received weight in operation 911. Upon reception of the ACK signal, the UE 801 may update the weight of the disposed Tx NN 805 to a newly learned weight in operation 906.

The UE 801 and the BS 802 may perform autoencoder-based downlink channel feedback 700 of FIG. 7 using the Tx NN 805 and the Rx NN 808, the weights of which are updated.

Second Embodiment

According to the second embodiment, a BS learns a connection weight of an autoencoder NN via shadow training, and transmits information associated with the learned weight to a UE so as to update the weight of the autoencoder NN.

Figure 10:
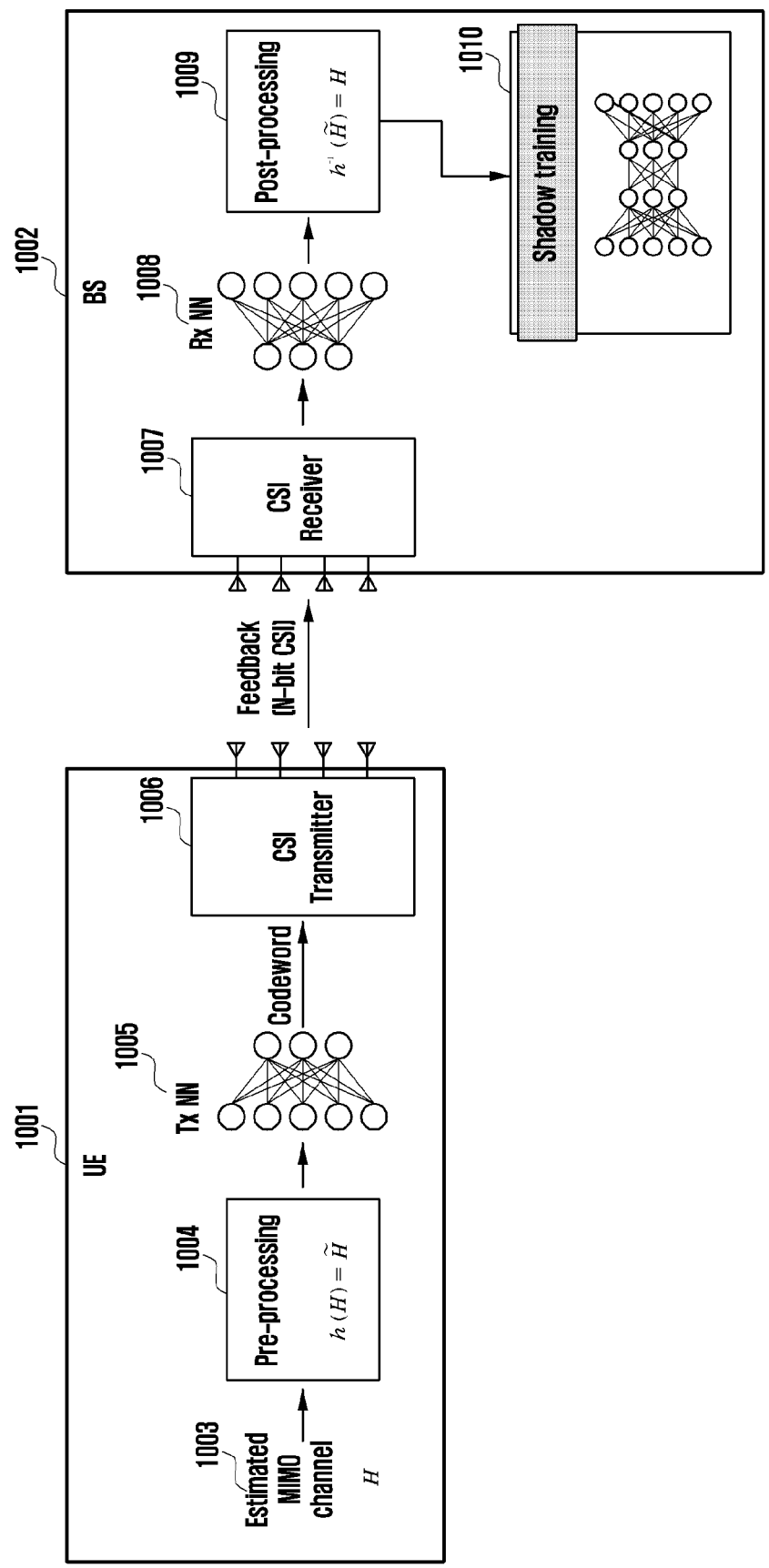
FIG. 10 illustrates a block diagram illustrating the operations of a UE and a BS according to a second embodiment.
Figure 11:
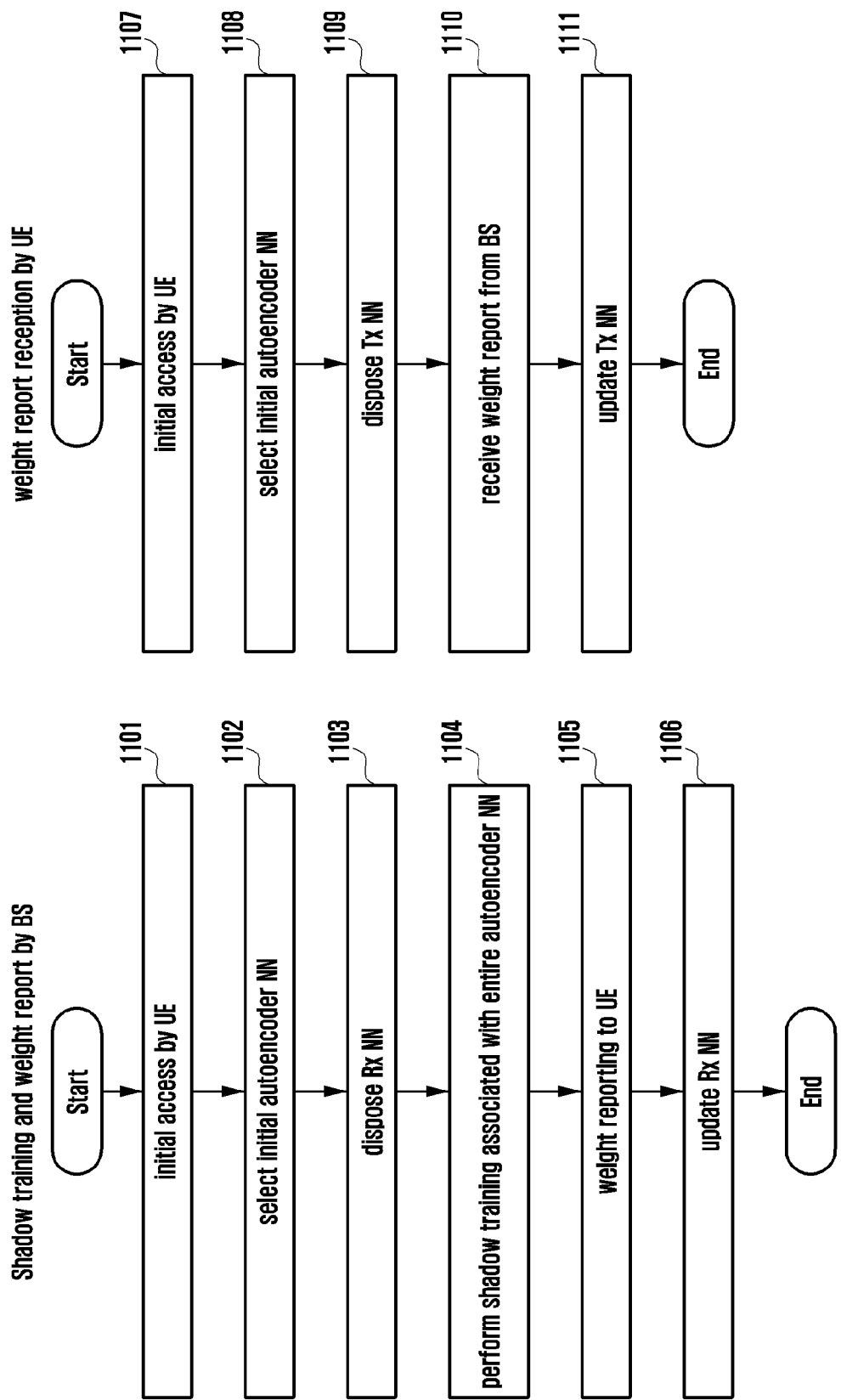
FIG. 11 illustrates a flowchart illustrating the operations of a UE and a BS according to the second embodiment.

FIG. 10 illustrates a diagram illustrating the operations of a UE and a BS according to the second embodiment. FIG. 11 illustrates a diagram illustrating the operations of a UE and a BS according to the second embodiment.

A UE 1001 and a BS 1002 may share a set of autoencoder NNs including a limited number of elements which are defined/trained in advance. The set may be a set including one or more autoencoder NNs as elements, and each autoencoder has a structure corresponding to the number of layers and the number of nodes for each layer, which are determined based on the physical situation between a UE and a BS. Here, the physical situation may include an operating frequency, a UE bandwidth, an antenna configuration of a UE/BS, or the like. Initial connection weights of respective autoencoder NNs in the set may be learned in advance on the assumption of a predetermined situation.

Each of the UE 1001 and the BS 1002 may obtain information associated with the physical situation of the other thereof after the initial access 1101 and 1107, and may select one element from the set of autoencoder NNs in operations 1102 and 1108. That is, the UE and the BS may select an autoencoder NN having an appropriate structure among a plurality of autoencoder NNs defined/trained in advance based on the obtained information associated with the physical situation after the initial access.

The UE 1001 may dispose a Tx NN 1005 of the selected autoencoder NN on a UE side in operation 1109, and the BS 1002 may dispose an Rx N 1008 of the selected NN on a BS side in operation 1103. In this instance, the BS may dispose, on the BS side, a plurality of Rx NNs different for each of the UEs existing in a cell. The UE 1001 and the BS 1002 may perform autoencoder-based downlink channel feedback 700 of FIG. 7 using the Tx NN 1005 and the Rx NN 1008, respectively disposed therein. The autoencoder-based downlink channel feedback 700 has been described with reference to FIG. 7, and thus a detailed description thereof will be omitted here.

The BS 1002 may prepare an entire autoencoder NN including both a Tx NN and an Rx NN for shadow training, in addition to the Rx NN 1008 disposed in the BS. According to an embodiment, the UE may estimate a downlink channel matrix H 1003 using a signal received from the BS, and may transmit the same to the BS via the autoencoder-based downlink channel feedback 700. In this instance, the signal received from the BS may include, for example, a CRS, a CSI-RS, a synchronization signal, a DMRS, and the like, but is not limited thereto. The BS may continuously perform shadow training 1010 associated with the entire autoencoder NN using the received downlink channel matrix H 1009 as learning data in operation 1104. According to another embodiment, the BS 1002 may estimate a channel matrix using a reference signal received from the UE 1001, and may perform shadow training using the estimated channel matrix as learning data. The reference signal that the UE 1001 transmits to the BS 1002 may include, for example, an SRS, a DMRS, and the like, but is not limited thereto. That is, the BS 1002 may continuously update connection weights of the autoencoder NN prepared for shadow training using a channel matrix estimated by the BS based on a signal (an SRS, a DMRS, . . . ) received from the UE 1001 or a channel matrix estimated by the UE and received from the UE.

The BS 1002 may transmit, to the UE 1001, the weight of a Tx NN (weight report) among weights of the new entire autoencoder NN (Tx NN and Rx NN), updated via shadow training 1010, in operation 1105. According to an embodiment, the weight of the Tx NN may be transmitted to the UE 1001 via a downlink channel, for example, a PDCCH or a PD SCH.

According to an embodiment, the BS 1002 may transmit, to the UE 1001, the weight of the Tx NN, which is updated via periodic weight reporting. In this instance, the period at which the weight of the Tx NN is transmitted may be set in consideration of the amount of time that the BS 1002 needs to perform shadow training. Preferably, the period may be set to be longer than a channel state information report period (CSI report period).

According to an embodiment, the BS 1002 may transmit, to the UE 1001, the weight of the Tx NN, which is updated via aperiodic weight reporting. The BS 1002 may perform weight reporting in response to an aperiodic weight report request from the UE 1001, or may perform weight reporting if the performance of an autoencoder NN, which performs shadow training, satisfies a predetermined condition. Here, the performance of the autoencoder NN may be defined using an index indicating the degree of a difference between an input and an output of the autoencoder NN. For example, the performance of the autoencoder NN may be defined using a mean squared error (MSE) value between an input and an output. Also, the predetermined condition may be, for example, the condition that the performance of an autoencoder NN is greater than or equal to a predetermined reference, that is, that the difference between an input and an output is less than a predetermined reference. Here, the predetermined reference may be a value determined in advance and input to the BS, or may be a value arbitrarily set by the UE.

A weight report transmitted by the BS 1002 may include a request for updating a Tx NN disposed in the UE 1001. The UE 1001 that receives the weight report may transmit an ACK signal that acknowledges reception of the weight report to the BS 1002, and may update the weight of the currently disposed Tx NN 1005 to a new received weight in operation 1111. Upon reception of the ACK signal, the BS may update the weight of the disposed Rx NN 1008 to a newly learned weight in operation 1106.

The UE 1001 and the BS 1002 may perform the autoencoder-based downlink channel feedback 700 shown in FIG. 7 using the Tx NN 1005 and the Rx NN 1008, the weights of which are updated.

Third Embodiment

According to the third embodiment, channel feedback may be performed by switching a mode among a mode 1200 (mode 1) in which a UE performs shadow training using a scheme that directly feeds back a channel matrix, an autoencoder-based channel feedback mode 1400 (mode 2), and a mode 1600 (mode 3) in which a base station performs shadow training using a scheme that directly feeds back a channel matrix.

Hereinafter, a method of transmitting or receiving a signal based on an autoencoder NN according to the third embodiment will be described with reference to FIGS. 12 to 17.

Figure 12:
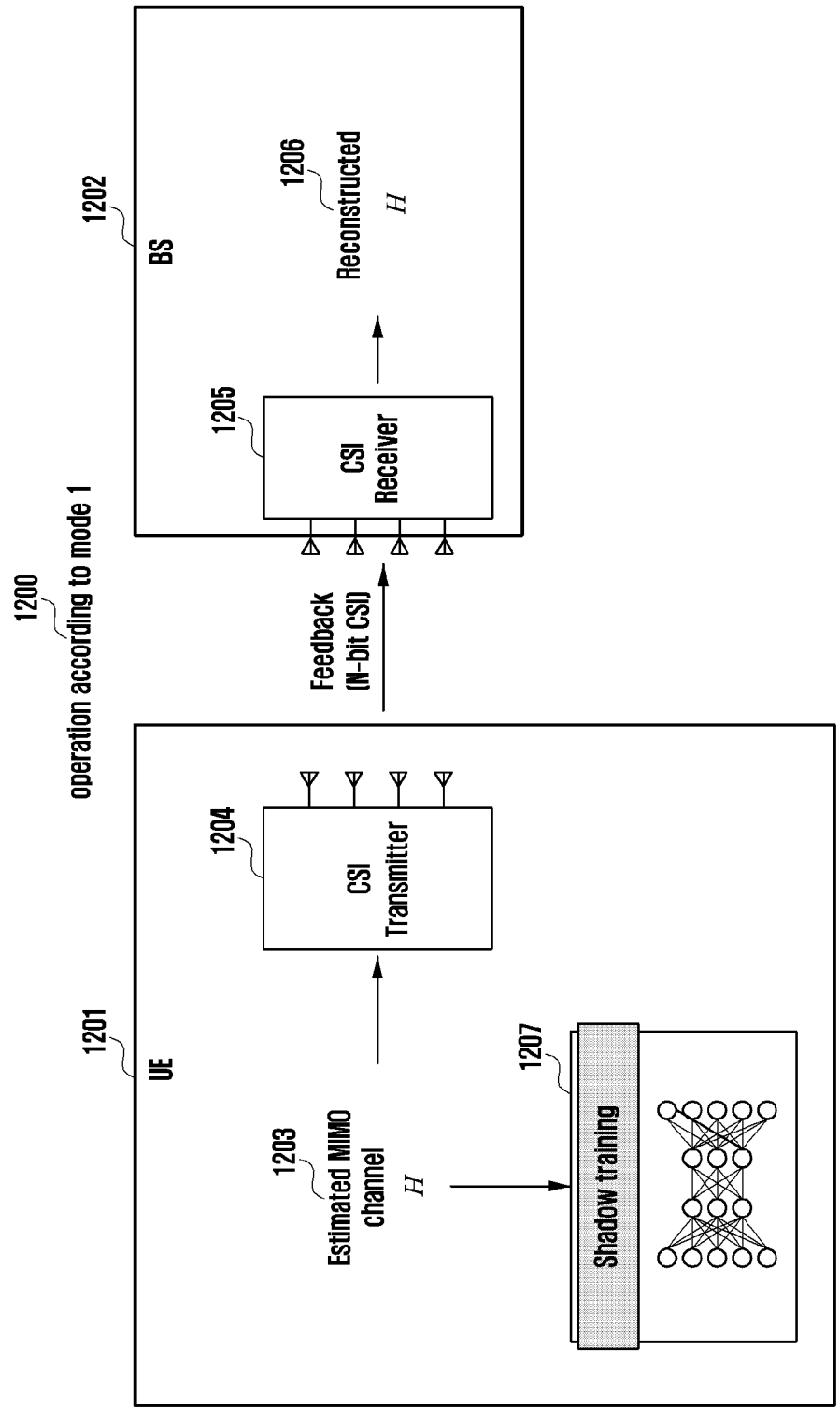
FIG. 12 illustrates a block diagram illustrating the operations of a UE and a BS in mode 1 according to a third embodiment.
Figure 13:
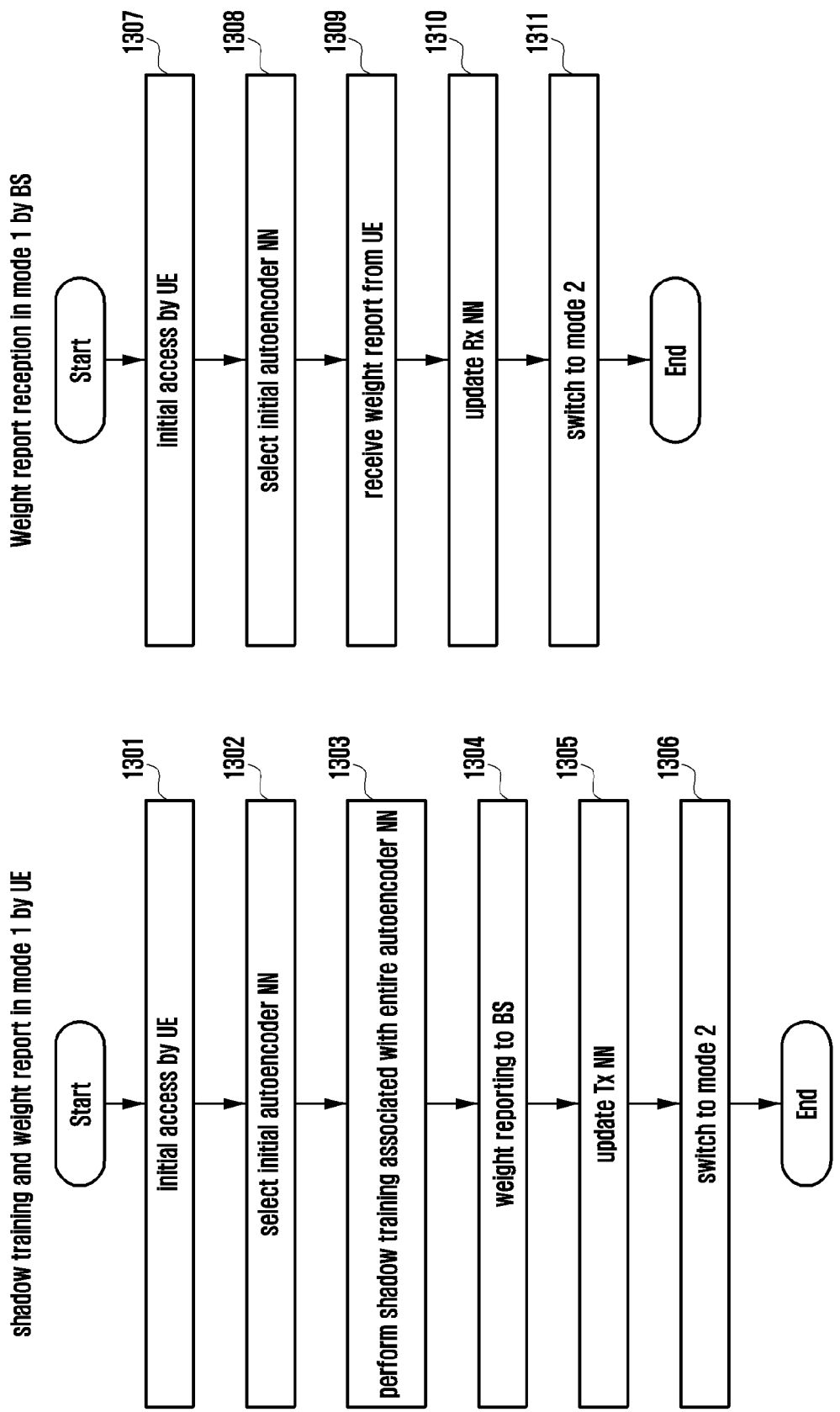
FIG. 13 illustrates a flowchart illustrating the operations of a UE and a BS in the mode 1 according to the third embodiment.

FIG. 12 illustrates a diagram illustrating the operations of a UE and a BS in mode 1 according to the third embodiment.
FIG. 13 illustrates a diagram illustrating the operations of a UE and a BS in mode 1 according to the third embodiment.

Particularly, FIGS. 12 and 13 illustrate the scheme in which a UE performs shadow training using a scheme that directly feeds back a channel matrix in mode 1.

A UE 1201 and a BS 1202 may share a set of autoencoder NNs including a limited number of elements that are defined/trained in advance. The set may be a set including one or more autoencoder NNs as elements, and each autoencoder has a structure corresponding to the number of layers and the number of nodes for each layer, which are determined based on the physical situation between a UE and a BS. Here, the physical situation may include an operating frequency, a UE bandwidth, an antenna configuration of a UE/BS, or the like. Initial connection weights of respective autoencoder NNs in the set may be learned in advance on the assumption of a predetermined situation.

Each of the UE 1201 and the BS 1202 may obtain information associated with the physical situation of the other thereof after the initial access 1301 and 1307, and may select one element from the set of autoencoder NNs in operations 1302 and 1308. That is, the UE 1201 and the BS 1202 may select an autoencoder NN having an appropriate structure among a plurality of autoencoder NNs defined/trained in advance based on the obtained information associated with the physical situation after the initial access.

The UE 1201 may prepare an entire autoencoder NN 1207 including both a Tx NN and an Rx NN of the autoencoder NN selected for shadow training. According to an embodiment, the UE may use a downlink channel matrix H 1203, which is estimated using a signal received from the BS, as learning data, and may continuously perform shadow training 1207 associated with the entire autoencoder NN in operation 1303. The signal that the UE receives from the BS may include, for example, a CRS, a CSI-RS, a synchronization signal, a DMRS, and the like, but is not limited thereto. According to another embodiment, the UE 1201 may receive, from the BS 1202, a channel matrix, estimated using the reference signal that the UE transmits to the BS 1202, and may perform shadow training using the estimated channel matrix as learning data. The reference signal that the UE 1201 transmits to the BS 1202 may include, for example, an SRS and a DMRS, but is not limited thereto. That is, the UE 1201 may continuously update connection weights of the autoencoder NN prepared for shadow training using a channel matrix estimated by the UE based on a signal (a CRS, a CSI-RS, a synchronization signal, a DMRS, . . . ) received from the BS 1202 or a channel matrix estimated by the BS and received from the BS.

The UE 1201 may transmit, to the BS 1202, the weight of an Rx NN (weight report) among weights of the new entire autoencoder NN (Tx NN and Rx NN), updated via shadow training 1207, in operation 1304. According to an embodiment, the weight of the Rx NN may be transmitted to the BS 1202 via an uplink channel, for example, a PUCCH or a PUSCH. According to an embodiment, a weight report transmitted by the UE 1201 may include a request that the BS 1202 switch to mode 2.

According to an embodiment, the UE 1201 may transmit, to the BS 1202, the weight of an Rx NN, updated via periodic weight reporting. In this instance, the period at which the weight of the Rx NN is transmitted may be set in consideration of the amount of time that the UE 1201 needs to perform shadow training. Preferably, the period may be set to be longer than a channel state information report period (CSI report period).

According to an embodiment, the UE 1201 may transmit, to the BS 1202, the weight of an Rx NN, which is updated via aperiodic weight reporting. The UE 1201 may perform weight reporting in response to an aperiodic weight report request from the BS 1202, or may perform weight reporting if the performance of an autoencoder NN, which performs shadow training, satisfies a predetermined condition. Here, the performance of the autoencoder NN may be defined using an index indicating the degree of a difference between an input and an output of the autoencoder NN. For example, the performance of the autoencoder NN may be defined using a mean squared error (MSE) value between an input and an output. Also, the predetermined condition may be, for example, a condition that the performance of an autoencoder NN is greater than or equal to a predetermined reference, that is, that the difference between an input and an output is less than a predetermined reference. Here, the predetermined reference may be a value determined in advance and input to the UE, or may be a value arbitrarily set by the UE. That is, if the result of shadow training determines that the performance of the autoencoder NN is greater than or equal to a predetermined level, the UE 1201 may request the BS 1202 to switch to mode 2, via weight reporting, so that signal transmission or reception is performed via the trained autoencoder NN. The condition that is used as the criterion for an aperiodic request of mode 1 may be set to be the same as, or different from, the condition used in mode 2 or mode 3.

A weight report transmitted by the UE 1201 may include a request that the BS 1202 update an Rx NN. The BS 1202 that receives the weight report may transmit an ACK signal that acknowledges reception of the weight report to the UE 1201 in operation and may update the weight of the retained Rx NN to a new received weight in operation 1310. Upon reception of the ACK signal, the UE 1201 may update the weight of the retained Tx NN to a newly learned weight in operation 1305.

The UE 1201 and the BS 1202 may respectively update the weights of the Tx NN and the Rx NN, and may switch to mode 2 in operations 1306 and 1311.

Figure 14:
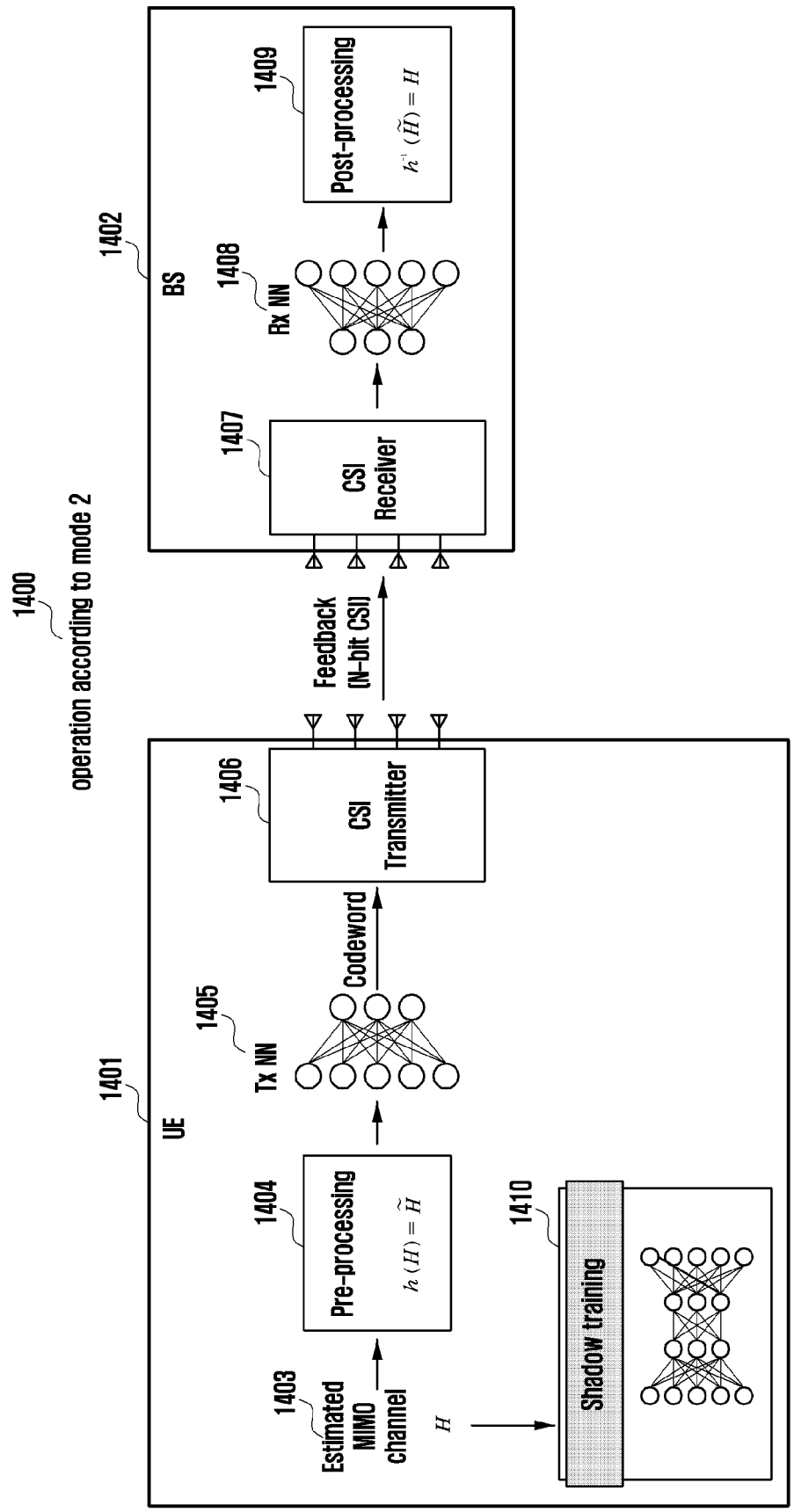
FIG. 14 illustrates a block diagram illustrating the operations of a UE and a BS in mode 2 according to the third embodiment.
Figure 15:
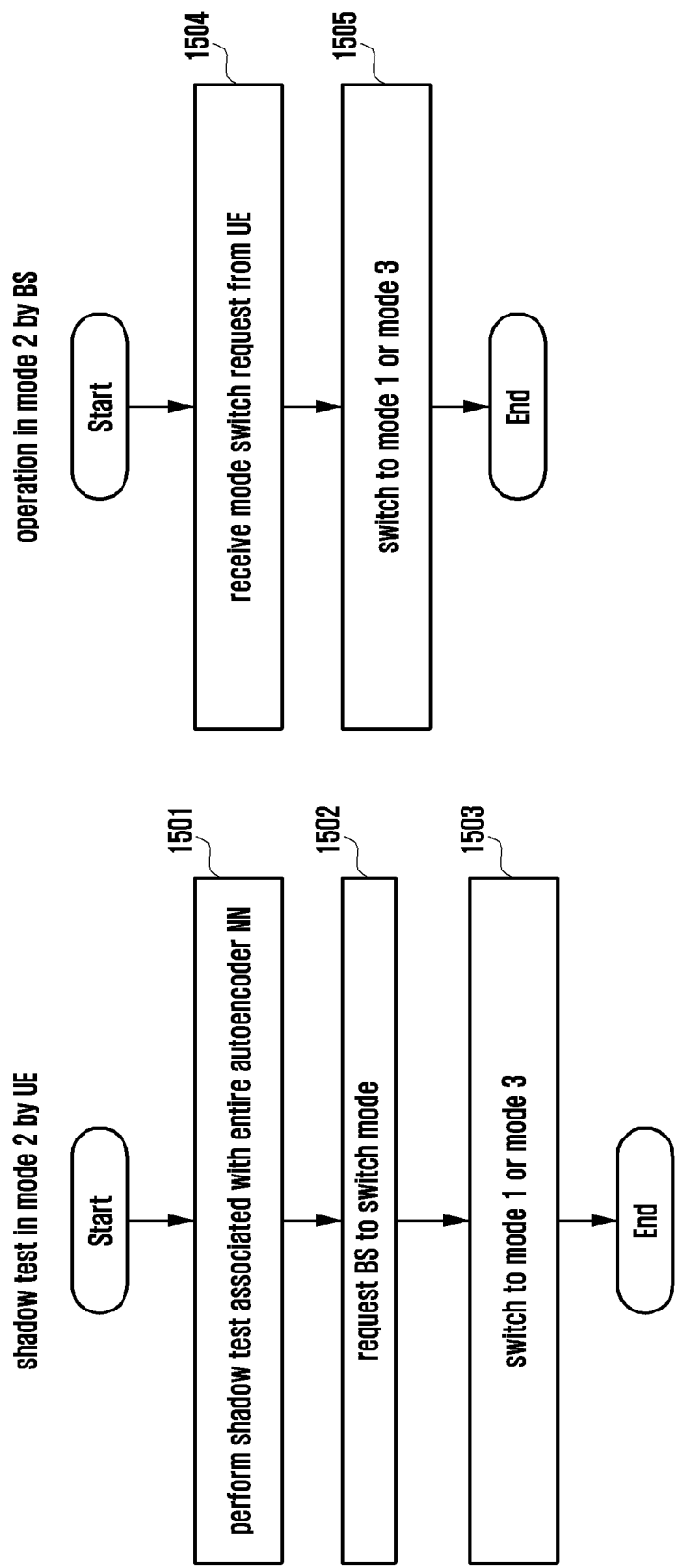
FIG. 15 illustrates a flowchart illustrating the operations of a UE and a BS in the mode 2 according to the third embodiment.

FIG. 14 illustrates a diagram illustrating the operations of a UE and a BS in mode 2 according to the third embodiment. FIG. 15 illustrates a diagram illustrating the operations of a UE and a BS in mode 2 according to the third embodiment.

Particularly, FIGS. 14 and 15 illustrate a scheme in which a UE performs shadow testing 1410 while performing the autoencoder-based channel feedback scheme 700 according to mode 2.

A UE 1401 may dispose a Tx NN 1405, updated according to the operations performed based on mode 1 or mode 3, on a UE side, and a BS 1402 may dispose an Rx NN 1408, updated according to the operations performed based on mode 3, on a BS side. In this instance, the BS may dispose, on the BS side, a plurality of Rx NNs different for each of the UEs existing in a cell. The UE and the BS may perform autoencoder-based downlink channel feedback 700 of FIG. 7 using the respectively disposed Tx NN 1005 and the Rx NN 1008. The autoencoder-based downlink channel feedback 700 has been described with reference to FIG. 7, and herein, the detailed description thereof will be omitted.

According to an embodiment, the UE 1401 may continuously test the performance of the currently used autoencoder NN using an estimated channel matrix in operation 1501. In the disclosure, this is referred to as a "shadow test" 1410. Subsequently, the UE 1401 may request the BS 1402 to switch to mode 1 or mode 3. The request may be transmitted to the BS via an uplink channel, for example, a PUCCH or a PUSCH.

According to an embodiment, the UE 1401 may periodically request the BS 1402 to switch to mode 1 or mode 3. In this instance, the period at which the UE 1401 requests the BS 1402 to switch a mode may be determined randomly.

According to an embodiment, the UE 1401 may aperiodically request the BS 1402 to switch to mode 1 or mode 3. In response to a request from the BS 1402, the UE 1401 may request switching to mode 1 or mode 3, or if the performance of an autoencoder NN, measured via a shadow test, satisfies a predetermined condition, the UE 1401 may request switching to mode 1 or mode 3 in operation 1502.

Here, the performance of the autoencoder NN may be defined using an index indicating the degree of the difference between an input and an output of the autoencoder NN. For example, the performance of the autoencoder NN may be defined using a mean squared error (MSE) value between an input and an output. Also, the predetermined condition may be, for example, a condition that the performance of an autoencoder NN is less than a predetermined reference, that is, that the difference between an input and an output exceeds a predetermined reference. That is, if the result of continuous shadow testing shows that the performance of an autoencoder NN used for signal transmission or reception is less than a predetermined level, the UE 1401 may request the BS 1402 to switch to mode 1 or mode 3 for shadow training. The condition that is used as the criterion for an aperiodic request of mode 2 may be set to be the same as, or different from, the condition used in mode 1 or mode 3.

In operation 1505, the BS 1402 may switch to mode 1 or mode 3 after transmitting, to the UE, an ACK signal that acknowledges reception 1504 of the mode switch request. Also, upon reception of the ACK signal, the UE 1401 may switch to mode 1 or mode 3 in operation 1503.

Figure 16:
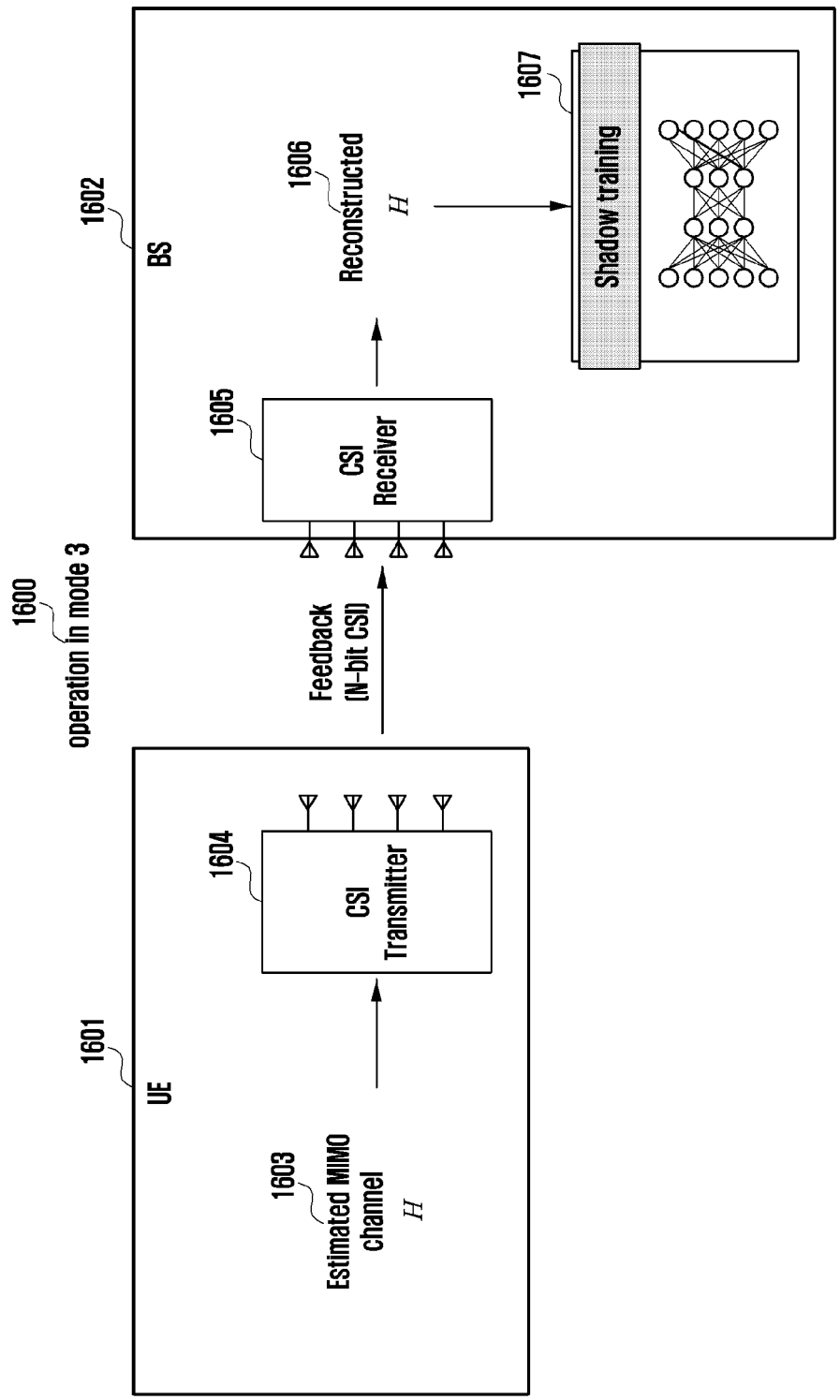
FIG. 16 illustrates a block diagram illustrating the operations of a UE and a BS in mode 3 according to the third embodiment.
Figure 17:
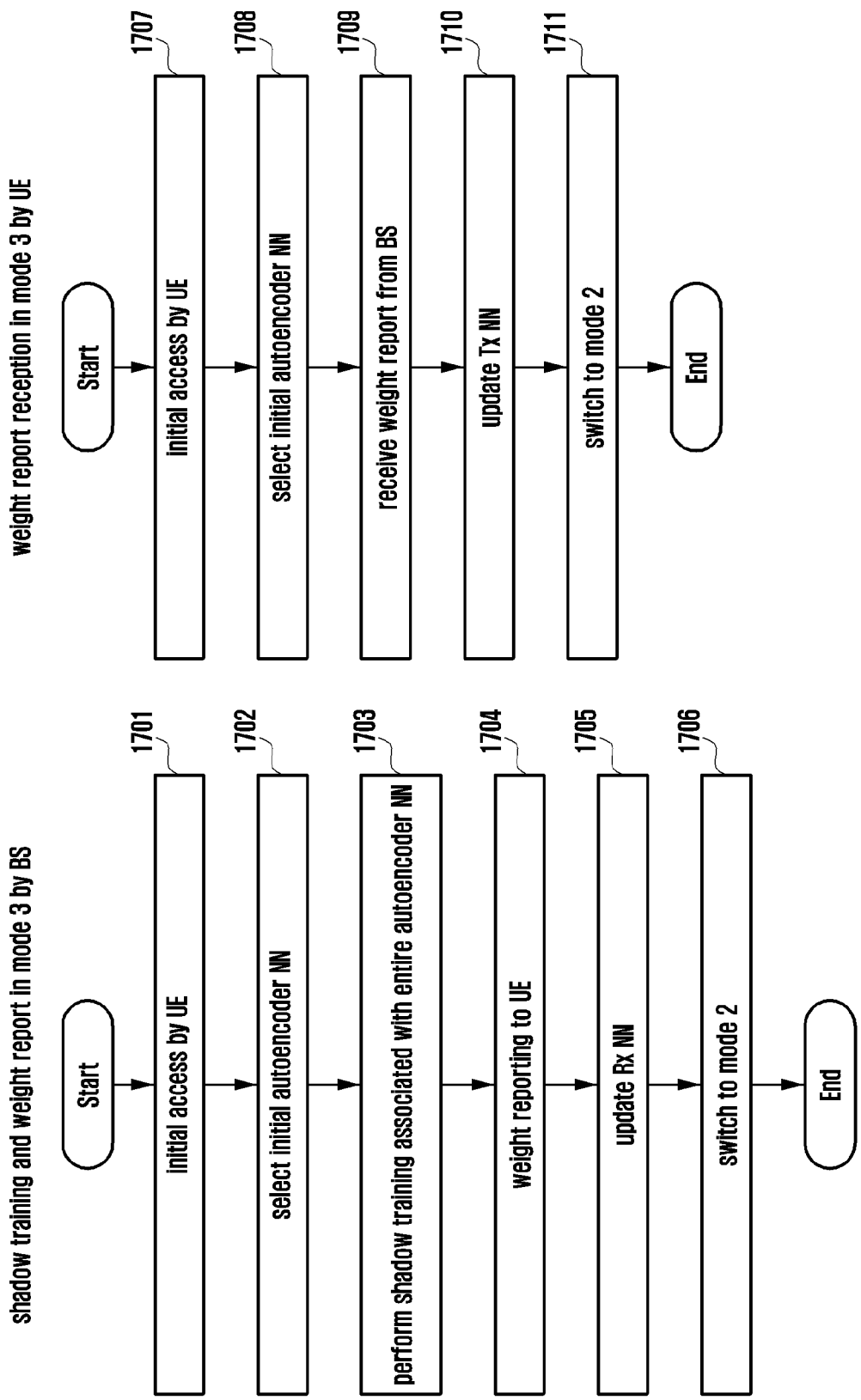
FIG. 17 illustrates a flowchart illustrating the operations of a UE and a BS in the mode 3 according to the third embodiment.

FIG. 16 illustrates a diagram illustrating the operations of a UE and a BS in mode 3 according to the third embodiment.
FIG. 17 illustrates a diagram illustrating the operations of a UE and a BS in mode 3 according to the third embodiment.

Particularly, FIGS. 16 and 17 illustrate a scheme (mode 3) in which a BS performs shadow training using a scheme that directly feeds back a channel matrix according to mode 3.

A UE 1601 and a BS 1602 may share a set of autoencoder NNs including a limited number of elements which are defined/trained in advance. The set may be a set including one or more autoencoder NNs as elements, and each autoencoder has a structure corresponding to the number of layers and the number of nodes for each layer, which are determined based on the physical situation between a UE and a BS. Here, the physical situation may include an operating frequency, a UE bandwidth, an antenna configuration of a UE/BS, or the like. Initial connection weights of respective autoencoder NNs in the set may be learned in advance on the assumption of a predetermined situation.

Each of the UE 1601 and the BS 1602 may obtain information associated with the physical situation of the other thereof after the initial access 1701 and 1707, and may select one element from the set of autoencoder NNs in operations 1702 and 1708. That is, the UE 1601 and the BS 1602 may select an autoencoder NN having an appropriate structure among a plurality of autoencoder NNs defined/trained in advance, based on the obtained information associated with the physical situation after the initial access.

The BS 1602 may prepare an entire autoencoder NN 1607 including both a Tx NN and an Rx NN of the autoencoder NN selected for shadow training. According to an embodiment, the UE may estimate a downlink channel matrix H 1603 using a signal received from the BS, and may transmit the same to the BS 1602. The BS 1602 may continuously perform shadow training 1607 associated with the entire autoencoder NN using the received downlink channel matrix H 1606 as learning data in operation 1703. In this instance, the signal that the UE receives from the BS may include, for example, a CRS, a CSI-RS, a synchronization signal, a DMRS, and the like, but is not limited thereto. According to another embodiment, the BS 1602 may estimate a channel matrix using a reference signal received from the UE 1601, and may perform shadow training using the estimated channel matrix as learning data. The reference signal that the UE 1601 transmits to the BS 1602 may include, for example, an SRS and a DMRS, but it is not limited thereto. That is, the BS 1602 may continuously update connection weights of the autoencoder NN, prepared for shadow training, using a channel matrix estimated by the BS based on a signal (an SRS, a DMRS, . . . ) received from the UE 1601 or a channel matrix estimated by the UE and received from the UE.

The BS 1602 may transmit, to the UE, the weight of a Tx NN (weight report) among weights of the new entire autoencoder NN (Tx NN and Rx NN), updated via shadow training 1607, in operation 1704. According to an embodiment, the weight of the Tx NN may be transmitted to the UE 1601 via a downlink channel, for example, a PDCCH or a PDSCH. According to an embodiment, the weight report transmitted by the BS 1602 may include a request that the UE 1601 switch to mode 2.

According to an embodiment, the BS 1602 may transmit, to the UE 1601, the weight of a Tx NN, which is updated via periodic weight reporting. In this instance, the period at which the weight of the Tx NN is transmitted may be set in consideration of the amount of time that the BS 1602 needs to perform shadow training. Preferably, the period may be set to be longer than a channel state information report period (CSI report period).

According to an embodiment, the BS 1601 may transmit, to the UE 1601, the weight of the Tx NN, which is updated via aperiodic weight reporting. The BS 1602 may perform weight reporting in response to an aperiodic weight report request from the UE 1601, or may perform weight reporting if the performance of an autoencoder NN, which performs shadow training, satisfies a predetermined condition. Here, the performance of the autoencoder NN may be defined using an index indicating the degree of the difference between the input and the output of the autoencoder NN. For example, the performance of the autoencoder NN may be defined using a mean squared error (MSE) value between an input and an output. Also, the predetermined condition may be, for example, a condition that the performance of an autoencoder NN is greater than or equal to a predetermined reference, that is, that the difference between an input and an output is less than a predetermined reference. Here, the predetermined reference may be a value determined in advance and input to the BS, or may be a value arbitrarily set by the BS. That is, if the result of shadow training shows that the performance of the autoencoder NN is greater than or equal to a predetermined level, the BS 1602 may request the UE 1601 to switch to mode 2 via weight reporting, so that signal transmission or reception is performed via the trained autoencoder NN. The condition that is used as the criterion for an aperiodic request of mode 3 may be set to be the same as, or different from, the condition used in mode 1 or mode 2.

The weight report transmitted by the BS 1602 may include a request that the UE 1601 update a Tx NN. The UE 1601 that receives the weight report may transmit an ACK signal that acknowledges reception of the weight report to the BS 1602, and may update the weight of the retained Tx NN to a new received weight in operation 1710. Upon reception of the ACK signal, the BS 1602 may update the weight of the retained Rx NN to a newly learned weight in operation 1705.

The UE 1601 and the BS 1602 may update the weights of the Tx NN and the Rx NN, respectively, and may switch to mode 2 in operations 1706 and 1711.

Figure 18:
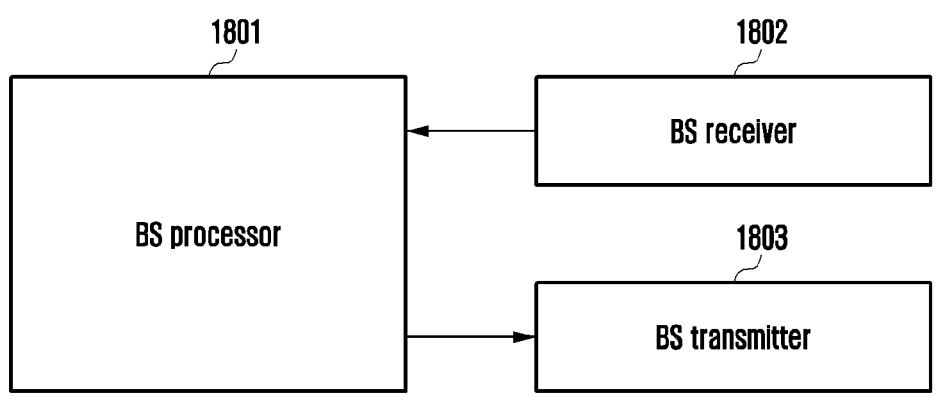
FIG. 18 illustrates a block diagram illustrating the structure of a BS according to an embodiment.
Figure 19:
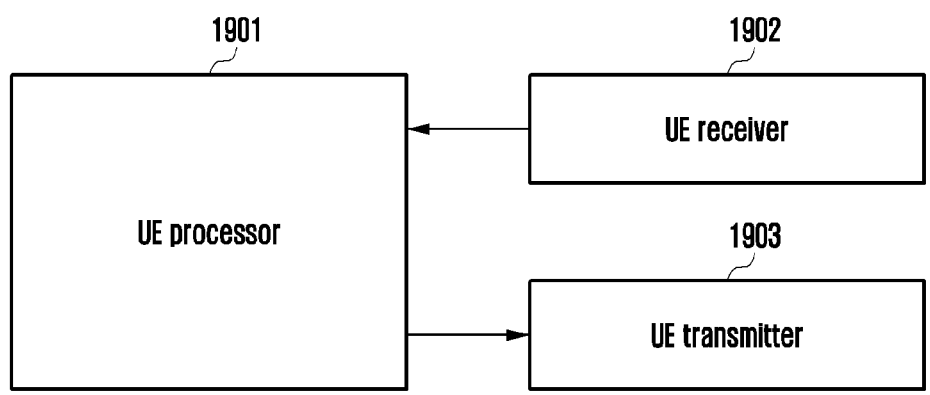
FIG. 19 illustrates a block diagram illustrating the structure of a UE according to an embodiment.

To implement the above-described embodiments of the disclosure, a transmitter, a receiver, and a controller of each of the BS and the UE are illustrated in FIGS. 18 and 19. Disclosed is a transmission or reception method of a BS and a UE for applying a method of transmitting or receiving an uplink/downlink control channel and a data channel in a communication system according to the embodiment. To this end, a transmitter, a receiver, and a processor of each of the BS and the UE need to operate according to each embodiment.

FIG. 18 illustrates a block diagram illustrating the structure of a BS according to an embodiment. As illustrated in FIG. 18, the BS of the disclosure may include a BS processor 1801, a BS receiver 1802, and a BS transmitter 1803. The BS processor 1801 may control a series of processes such that the BS operates according to the above-described embodiments. For example, the BS processor 1801 may control downlink control channel allocation and transmission using an OFDM signal, RS and data channel resource mapping and transmission or reception thereof, and the like. The BS receiver 1802 and the BS transmitter 1803 are commonly called a transceiver in the embodiments. The transceiver may perform transmission or reception of a signal with a UE. The signal may include control information and data. To this end, the transceiver may include an RF transmitter that up-converts and amplifies the frequency of a transmitted signal, an RF receiver that low-noise amplifies a received signal and down-converts the frequency, and the like. Also, the transceiver may output, to the BS processor 1801, a signal received via a wireless channel, and may transmit a signal output from the BS processor 1801 via a wireless channel.

FIG. 19 illustrates a block diagram illustrating the structure of a UE according to an embodiment. As illustrated in FIG. 19, the UE of the disclosure may include a UE processor 1901, a UE receiver 1902, and a UE transmitter 1903. The UE processor 1901 may control a series of processes such that the UE operates according to the above-described embodiments. For example, the UE processor 1901 may control downlink control channel reception using an OFDM signal, RS and data channel transmission or reception, and the like. The UE receiver 1902 and the UE transmitter 1903 are commonly called a transceiver in the embodiments. The transceiver may perform signal transmission or reception with a BS. The signal may include control information and data. To this end, the transceiver may include an RF transmitter that up-converts and amplifies the frequency of a transmitted signal, an RF receiver that low-noise amplifies a received signal and down-converts the frequency, and the like. Also, the transceiver may output, to the UE processor 1901, a signal received via a wireless channel, and may transmit a signal output from the UE processor 1901 via a wireless channel.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of transmitting or receiving a signal by a user equipment (UE) in a mobile communication system, the method comprising:

selecting a neural network model corresponding to an autoencoder among a plurality of autoencoders based on at least one parameter associated with a wireless link between the UE and a base station (BS), the at least one parameter including an operating frequency, a UE bandwidth, and antenna configurations of the UE and the BS, wherein the neural network model includes a transmission (Tx) neural network disposed in the UE and a reception (Rx) neural network disposed in the BS;

learning a connection weight of the neural network model using a shadow neural network disposed in the UE based on a channel matrix, the channel matrix being estimated by the UE or being received from the BS, wherein a first neural network corresponding to the Tx neural network and a second neural network corresponding to the Rx neural network are included in the shadow neural network for shadow training;

transmitting, to the BS, a new connection weight of the Rx neural network based on result of the learning;

receiving, from the BS, an acknowledgement (ACK) signal indicating that the new connection weight is received by the BS, wherein a weight of the Rx neural network is updated based on the new connection weight;

updating a weight of the Tx neural network based on the result of the learning after the ACK signal is received from the BS; and transmitting, to the BS, channel state information (CSI) feedback information based on the updated weight of the Tx neural network.

2. The method of claim 1,
wherein the neural network model further comprises at least one hidden layer with a number of nodes less than a number of nodes of an input layer and less than a number of nodes of an output layer.

3. The method of claim 1, wherein the new connection weight is periodically transmitted with a first periodicity, wherein the first periodicity is larger than a second periodicity for a channel state information (CSI) report.

4. The method of claim 1, wherein the new connection weight is aperiodically transmitted in response to a request from the BS.

5. The method of claim 1, wherein the new connection weight is aperiodically transmitted in response to a performance of the neural network model being greater than or equal to a threshold.

6. The method of claim 5, wherein the performance of the neural network model is defined based on a degree of a difference between an input and an output of the neural network model.

7. A method of transmitting or receiving a signal by a base station (BS) in a mobile communication system, the method comprising:

selecting a neural network model corresponding to an autoencoder among a plurality of autoencoders based on at least one parameter associated with a wireless link between a user equipment (UE) and the BS, the at least one parameter includes an operating frequency, a UE bandwidth, and antenna configurations of the UE and the BS, wherein the neural network model includes a transmission (Tx) neural network disposed in the UE and a reception (Rx) neural network disposed in the BS;

receiving, from the UE, a new connection weight of the Rx neural network, based on a result of a learning for a connection weight of the neural network model, transmitting, to the UE, an acknowledgement (ACK) signal indicating that the new connection weight is received by the BS;

updating a weight of the Rx neural network based on the new connection weight after the ACK signal is transmitted to the UE, wherein a weight of the Tx neural network is updated based on the result of the learning; and receiving, from the UE, channel state information (CSI) feedback based on the updated weight of the Rx neural network, wherein the learning is performed by a shadow neural network disposed in the UE based on a channel matrix, the channel matrix being estimated by the UE or being transmitted to the UE by the BS, and wherein a first neural network corresponding to the Tx neural network and a second neural network corresponding to the Rx neural network are included in the shadow neural network for shadow training.

8. The method of claim 7,
wherein the neural network model further comprises at least one hidden layer with a number of nodes less than a number of nodes of an input layer and less than a number of nodes of an output layer.

9. The method of claim 7, wherein a weight of the neural network model is learned in the UE based on channel information estimated by the UE.

10. A user equipment (UE) which transmits or receives a signal in a mobile communication system, the UE comprising:

a transceiver configured to transmit or receive a signal; and a controller configured to:

select a neural network model corresponding to an autoencoder among a plurality of autoencoders based on at least one parameter associated with a wireless link between the UE and a base station (BS), the at least one parameter includes an operating frequency, a UE bandwidth, and antenna configurations of the UE and the BS, wherein the neural network model includes a transmission (Tx) neural network disposed in the UE and a reception (Rx) neural network disposed in the BS, learn a connection weight of the neural network model using a shadow neural network disposed in the UE based on a channel matrix, the channel matrix being estimated by the UE_or being received from the BS, wherein a first neural network corresponding to the Tx neural network and a second neural network corresponding to the Rx neural network are included in the shadow neural network for shadow training, transmit, to the BS, a new connection weight of the Rx neural network based on a result of the learning, receive, from the BS, an acknowledgement (ACK) signal indicating that the new connection weight is received by the BS, wherein a weight of the Rx neural network is updated based on the new connection weight, update a weight of the Tx neural network based on the result of the learning after the ACK signal is received from the BS, and transmit, to the BS, channel state information (CSI) feedback information based on the updated weight of the Tx neural network.

11. The UE of claim 10, wherein the neural network model further comprises at least one hidden layer with a number of nodes less than a number of nodes of an input layer and less than a number of nodes of an output layer.

12. A base station (BS) which transmits or receives a signal in a mobile communication system, the BS comprising:
a transceiver configured to transmit or receive a signal; and
a controller configured to:
select a neural network model corresponding to an autoencoder among a plurality of autoencoders based on at least one parameter associated with a wireless link between a user equipment (UE) and the BS, the at least one parameter includes an operating frequency, a UE bandwidth, and antenna configurations of the UE and the BS, wherein the neural network model includes a transmission (Tx) neural network disposed in the UE and a reception (Rx) neural network disposed in the BS,
receive, from the UE, a new connection weight of the Rx neural network, based on a result of a learning for a connection weight of the neural network model,
transmit, to the UE, an acknowledgement (ACK) signal indicating that the new connection weight is received by the BS,
update a weight of the Rx neural network based on the new connection weight after the ACK signal is transmitted to the UE, wherein a weight of the Tx neural network is updated based on the result of the learning, and
receive, from the UE, channel state information (CSI) feedback information based on the updated weight of the Rx neural network,
wherein the learning is performed by a shadow neural network disposed in the UE based on a channel matrix, the channel matrix being estimated by the UE or being transmitted to the UE by the BS, and
wherein a first neural network corresponding to the Tx neural network and a second neural network corresponding to the Rx neural network are included in the shadow neural network for shadow training.

13. The BS of claim 12, wherein the neural network model further comprises at least one hidden layer with a number of nodes less than a number of nodes of an input layer and less than a number of nodes of an output layer.

* * * * *